US012671803B2

(12) United States Patent
Teng et al.

(10) Patent No.: US 12,671,803 B2
(45) Date of Patent: Jun. 30, 2026

(54) DEVICE AND METHOD FOR DECODING VIDEO DATA BY RECONSTRUCTING CHROMA BLOCK UNIT BASED ON BI-PREDICTIVE-IBC-BASED CANDIDATE

(71) Applicant: SHARP KABUSHIKI KAISHA, Sakai City (JP)

(72) Inventors: Chih-Yu Teng, Taipei (TW); Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/897,404

(22) Filed: Sep. 26, 2024

(65) Prior Publication Data

US 2025/0113020 A1    Apr. 3, 2025

Related U.S. Application Data

(60) Provisional application No. 63/586,226, filed on Sep. 28, 2023.

(51) Int. Cl.
H04N 19/105 (2014.01)
H04N 19/159 (2014.01)
H04N 19/176 (2014.01)
H04N 19/577 (2014.01)

(52) U.S. Cl.
CPC ......... H04N 19/105 (2014.11); H04N 19/159 (2014.11); H04N 19/176 (2014.11); H04N 19/577 (2014.11)

(58) Field of Classification Search
CPC .. H04N 19/105; H04N 19/159; H04N 19/176; H04N 19/577; H04N 19/11; H04N 19/186; H04N 19/593
See application file for complete search history.

(56) References Cited

U.S. PATENT DOCUMENTS

| | | | | |
|---|---|---|---|---|
| 2024/0022739 A1* | 1/2024 | Li | .......................... | H04N 19/186 |
| 2024/0340408 A1* | 10/2024 | Kim | ..................... | H04N 19/159 |
| 2024/0348770 A1* | 10/2024 | Chang | ................... | H04N 19/521 |
| 2024/0430420 A1* | 12/2024 | Huang | ................. | H04N 19/176 |

OTHER PUBLICATIONS

Series H: Audiovisual and Multimedia Systems Infrastructure of audiovisual services—Coding of moving video, Versatile Video Coding, ITU-T H.266 (Apr. 2022).

(Continued)

*Primary Examiner* — Francis Geroleo
(74) *Attorney, Agent, or Firm* — ScienBiziP, P.C.

(57) ABSTRACT

A method of decoding video data performed by an electronic device is provided. The method receives the video data and determines, from a current frame included in the video data, a chroma block unit and a luma reconstruction block. The luma reconstruction block is collocated with the chroma block unit and reconstructed in bi-predictive intra block copy (IBC) mode. The method derives at least one bi-predictive-IBC-based candidate of the chroma block unit based on two luma block vectors used to reconstruct the luma reconstruction block in the bi-predictive IBC mode. The method reconstructs the chroma block unit based on the at least one bi-predictive-IBC-based candidate.

18 Claims, 10 Drawing Sheets

(56)     References Cited

OTHER PUBLICATIONS

Muhammed Coban et al., "Algorithm description of Enhanced Compression Model 9 (ECM 9)", JVET-AD2025, Joint Video Experts Team (JVET) of ITU-T SG 16 WP 3 and ISO/IEC JTC 1/SC 29, 30th Meeting, Antalya, TR, Apr. 21-28, 2023.
Adrian Browne et al., "Algorithm description for Versatile Video Coding and Test Model 20 (VTM20)", JVET-AD2002-v1, Joint Video Experts Team (JVET) of ITU-T SG 16 WP 3 and ISO/IEC JTC 1/SC 29, 30th Meeting, Antalya, TR, Apr. 21-28, 2023.

* cited by examiner

Bitstream

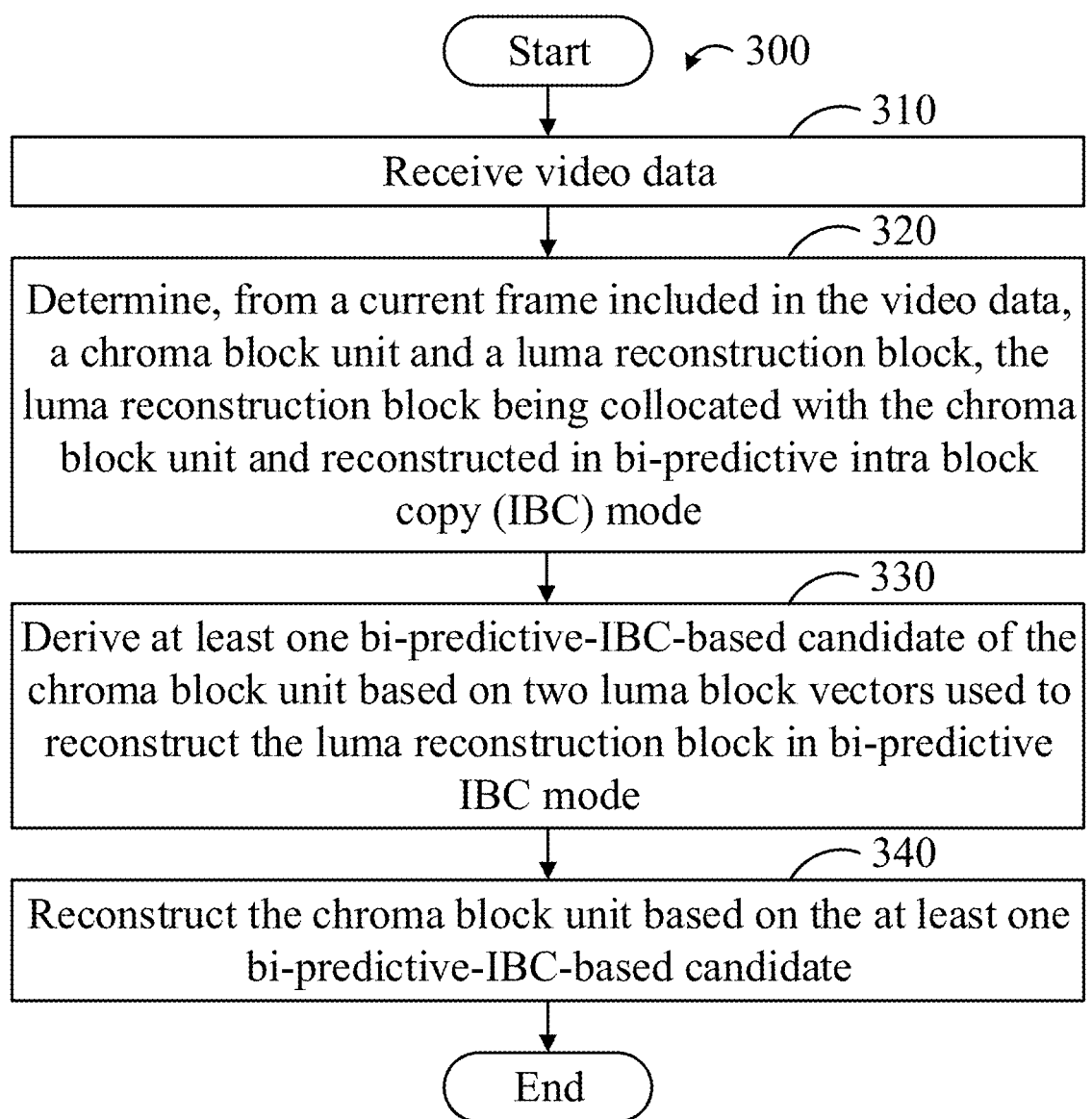

Start 300

310
Receive video data

320
Determine, from a current frame included in the video data, a chroma block unit and a luma reconstruction block, the luma reconstruction block being collocated with the chroma block unit and reconstructed in bi-predictive intra block copy (IBC) mode 330
Derive at least one bi-predictive-IBC-based candidate of the chroma block unit based on two luma block vectors used to reconstruct the luma reconstruction block in bi-predictive IBC mode 340
Reconstruct the chroma block unit based on the at least one bi-predictive-IBC-based candidate End

FIG. 3

DEVICE AND METHOD FOR DECODING VIDEO DATA BY RECONSTRUCTING CHROMA BLOCK UNIT BASED ON BI-PREDICTIVE-IBC-BASED CANDIDATE

CROSS-REFERENCE TO RELATED APPLICATION(S)

The present disclosure claims the benefit of and priority to U.S. Provisional Patent Application Ser. No. 63/586,226, filed on Sep. 28, 2023, entitled "Proposed Method of Block Vector Based Prediction," the content of which is hereby incorporated herein fully by reference in its entirety for all purposes.

FIELD

The present disclosure generally relates to video coding, and more specifically, to techniques for predicting a chroma block unit of a block unit based on two luma block vectors of a luma block unit of the block unit collocated with the chroma block unit.

BACKGROUND

Intra block copy (IBC) mode is a luma coding tool for video coding, in which, an encoder and/or a decoder may predict a luma block of a current block in a current frame based on a luma reference included in the current frame and indicated by a luma block vector. In addition, the encoder and/or the decoder may derive the chroma candidates for predicting a chroma block of the current block based on the luma block vector of the luma block in an IBC mode prior to the reconstruction of the chroma block.

A bi-predictive IBC mode is a new luma coding tool for predicting the luma block. Thus, a chroma candidate refinement shall be required for the encoder and/or the decoder to be able to precisely and efficiently predict and/or reconstruct the chroma block of the block unit based on the bi-predictive IBC mode of the luma block in the block unit.

SUMMARY

The present disclosure is directed to a device and method for predicting a chroma block unit of a block unit based on two luma block vectors of a luma block unit of the block unit collocated with the chroma block unit.

In a first aspect of the present disclosure, a method of decoding video data and an electronic device for performing the method are provided. The method includes receiving the video data; determining, from a current frame included in the video data, a chroma block unit and a luma reconstruction block, the luma reconstruction block being collocated with the chroma block unit and reconstructed in bi-predictive intra block copy (IBC) mode; deriving at least one bi-predictive-IBC-based candidate of the chroma block unit based on two luma block vectors used to reconstruct the luma reconstruction block in the bi-predictive IBC mode; and reconstructing the chroma block unit based on the at least one bi-predictive-IBC-based candidate.

In an implementation of the first aspect of the present disclosure, the at least one bi-predictive-IBC-based candidate is derived based on a predefined one of the two luma block vectors.

In another implementation of the first aspect of the present disclosure, one of the at least one bi-predictive-IBC-based candidate includes a chroma block vector, that is proportional to one of the two luma block vectors, and the one of the at least one bi-predictive-IBC-based candidate is derived based on the one of the two luma block vectors.

In another implementation of the first aspect of the present disclosure, the method further includes determining a chroma candidate list including one or more of multiple uni-predictive-based candidates or multiple bi-predictive-based candidates, where: each of the at least one bi-predictive-IBC-based candidate is included in the multiple bi-predictive-based candidates, and reconstructing the chroma block unit is further based on the one or more of the multiple uni-predictive-based candidates or the multiple bi-predictive-based candidates in the chroma candidate list.

In another implementation of the first aspect of the present disclosure, the method further includes determining, from the video data, a chroma prediction index indicating one of the one or more of the multiple uni-predictive-based candidates or the multiple bi-predictive-based candidates, where: reconstructing the chroma block unit is further based on the indicated one of the one or more of the multiple uni-predictive-based candidates or the multiple bi-predictive-based candidates.

In another implementation of the first aspect of the present disclosure, the method further includes determining, from the current frame, a chroma template region neighboring the chroma block unit; predicting the chroma template region using the one or more of the multiple uni-predictive-based candidates or the multiple bi-predictive-based candidates to generate one or more chroma template predictions; and determining one or more template cost values, each of the one or more template cost values comprising a template cost value between a chroma template reconstruction of the chroma template region and a corresponding one of the one or more chroma template predictions.

In another implementation of the first aspect of the present disclosure, the method further includes selecting one of the one or more of the multiple uni-predictive-based candidates or the multiple bi-predictive-based candidates based on the one or more template cost values, where reconstructing the chroma block unit is further based on the selected one of the one or more of the multiple uni-predictive-based candidates or the multiple bi-predictive-based candidates.

In another implementation of the first aspect of the present disclosure, the method further includes selecting two chroma prediction modes from the one or more of the multiple uni-predictive-based candidates or the multiple bi-predictive-based candidates; predicting the chroma block unit based on the two chroma prediction modes to generate two chroma prediction blocks; deriving two weighting parameters based on the one or more template cost values of the two chroma prediction modes; and weightedly combining the two chroma prediction blocks based on the two derived weighting parameters to generate a weighted block, where reconstructing the chroma block unit is further based on the weighted block.

In another implementation of the first aspect of the present disclosure, a specific one of the at least one bi-predictive-IBC-based candidate includes a chroma block vector derived based on a specific one of the two luma block vectors corresponding to the specific one of the at least one bi-predictive-IBC-based candidate when the specific one of the at least one bi-predictive-IBC-based candidate is derived in direct block vector (DBV) mode.

In another implementation of the first aspect of the present disclosure, a specific one of the at least one bi-predictive-IBC-based candidate includes a chroma intra prediction mode, derived based on a mode reference block indicated by a specific one of the two luma block vectors corresponding to the specific one of the at least one bi-predictive-IBC-based candidate, when the specific one of the at least one bi-predictive-IBC-based candidate is derived in chroma direct mode (DM), and the specific one of the at least one bi-predictive-IBC-based candidate includes a chroma prediction model derived based on a model reference block indicated by the specific one of the two luma block vectors corresponding to the specific one of the at least one bi-predictive-IBC-based candidate, when the specific one of the at least one bi-predictive-IBC-based candidate is derived in block-vector-guided convolutional cross-component model (BVG-CCCM) mode.

In another implementation of the first aspect of the present disclosure, at least one luma block unit including the luma reconstruction block is collocated with the chroma block unit, the number of the at least one luma block unit is equal to one when the chroma block unit is included in a single-tree block unit determined from the current frame, and the number of the at least one luma block unit is equal to or greater than one when the chroma block unit is included in a dual-tree block unit determined from the current frame.

In a second aspect of the present disclosure, an electronic device for decoding video data is provided. The electronic device includes at least one processor; and one or more non-transitory computer-readable media coupled to the at least one processor and storing one or more computer-executable instructions that, when executed by the at least one processor, cause the electronic device to: receive the video data; determine, from a current frame included in the video data, a chroma block unit and a luma reconstruction block, the luma reconstruction block being collocated with the chroma block unit and reconstructed in bi-predictive intra block copy (IBC) mode; derive at least one bi-predictive-IBC-based candidate of the chroma block unit based on two luma block vectors used to reconstruct the luma reconstruction block in the bi-predictive IBC mode; and reconstruct the chroma block unit based on the at least one bi-predictive-IBC-based candidate.

In an implementation of the second aspect of the present disclosure, the at least one bi-predictive-IBC-based candidate is derived based on a predefined one of the two luma block vectors.

In another implementation of the second aspect of the present disclosure, one of the at least one bi-predictive-IBC-based candidate includes a chroma block vector, that is proportional to one of the two luma block vectors, and the one of the at least one bi-predictive-IBC-based candidate is derived based on the one of the two luma block vectors.

In another implementation of the second aspect of the present disclosure, the one or more computer-executable instructions, when executed by the at least one processor, further cause the electronic device to: determine a chroma candidate list including one or more of multiple uni-predictive-based candidates or multiple bi-predictive-based candidates, where: each of the at least one bi-predictive-IBC-based candidate is included in the multiple bi-predictive-based candidates, and reconstructing the chroma block unit is further based on the one or more of the multiple uni-predictive-based candidates or the multiple bi-predictive-based candidates in the chroma candidate list.

In another implementation of the second aspect of the present disclosure, the one or more computer-executable instructions, when executed by the at least one processor, further cause the electronic device to: determine, from the video data, a chroma prediction index indicating one of the one or more of the multiple uni-predictive-based candidates or the multiple bi-predictive-based candidates, where: reconstructing the chroma block unit is further based on the indicated one of the one or more of the multiple uni-predictive-based candidates or the multiple bi-predictive-based candidates.

In another implementation of the second aspect of the present disclosure, the one or more computer-executable instructions, when executed by the at least one processor, further cause the electronic device to: determine, from the current frame, a chroma template region neighboring the chroma block unit; predict the chroma template region using the one or more of the multiple uni-predictive-based candidates or the multiple bi-predictive-based candidates to generate one or more chroma template predictions; and determine one or more template cost values, each of the one or more template cost values comprising a template cost value between a chroma template reconstruction of the chroma template region and a corresponding one of the one or more chroma template predictions.

In another implementation of the second aspect of the present disclosure, the one or more computer-executable instructions, when executed by the at least one processor, further cause the electronic device to: select one of the one or more of the multiple uni-predictive-based candidates or the multiple bi-predictive-based candidates based on the one or more template cost values, where reconstructing the chroma block unit is further based on the selected one of the one or more of the multiple uni-predictive-based candidates or the multiple bi-predictive-based candidates.

In another implementation of the second aspect of the present disclosure, the one or more computer-executable instructions, when executed by the at least one processor, further cause the electronic device to: select two chroma prediction modes from the one or more of the multiple uni-predictive-based candidates or the multiple bi-predictive-based candidates; predict the chroma block unit based on the two chroma prediction modes to generate two chroma prediction blocks; derive two weighting parameters based on the one or more template cost values of the two chroma prediction modes; and weightedly combine the two chroma prediction blocks based on the two derived weighting parameters to generate a weighted block, where reconstructing the chroma block unit is further based on the weighted block.

In another implementation of the second aspect of the present disclosure, a specific one of the at least one bi-predictive-IBC-based candidate includes a chroma block vector derived based on a specific one of the two luma block vectors corresponding to the specific one of the at least one bi-predictive-IBC-based candidate, when the specific one of the at least one bi-predictive-IBC-based candidate is derived in direct block vector (DBV) mode.

In another implementation of the second aspect of the present disclosure, a specific one of the at least one bi-predictive-IBC-based candidate includes a chroma intra prediction mode, derived based on a mode reference block indicated by a specific one of the two luma block vectors corresponding to the specific one of the at least one bi-predictive-IBC-based candidate, when the specific one of the at least one bi-predictive-IBC-based candidate is derived in chroma direct mode (DM), and the specific one of the at least one bi-predictive-IBC-based candidate includes a chroma prediction model derived based on a model reference block indicated by the specific one of the two luma block vectors corresponding to the specific one of the at least one bi-predictive-IBC-based candidate, when the specific one of the at least one bi-predictive-IBC-based candidate is derived in block-vector-guided convolutional cross-component model (BVG-CCCM) mode.

In another implementation of the second aspect of the present disclosure, at least one luma block unit including the luma reconstruction block is collocated with the chroma block unit, the number of the at least one luma block unit is equal to one when the chroma block unit is included in a single-tree block unit determined from the current frame, and the number of the at least one luma block unit is equal to or greater than one when the chroma block unit is included in a dual-tree block unit determined from the current frame.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

FIG. 3 is a flowchart illustrating a method/process for decoding and/or encoding video data by an electronic device, in accordance with one or more example implementations of this disclosure.

DETAILED DESCRIPTION

Figure 1:
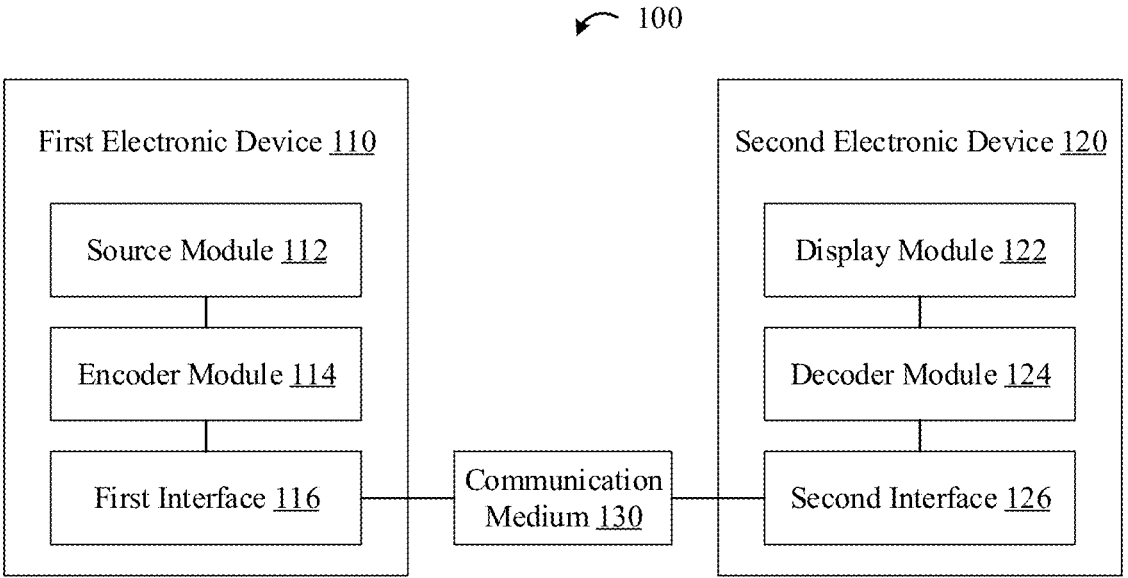
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
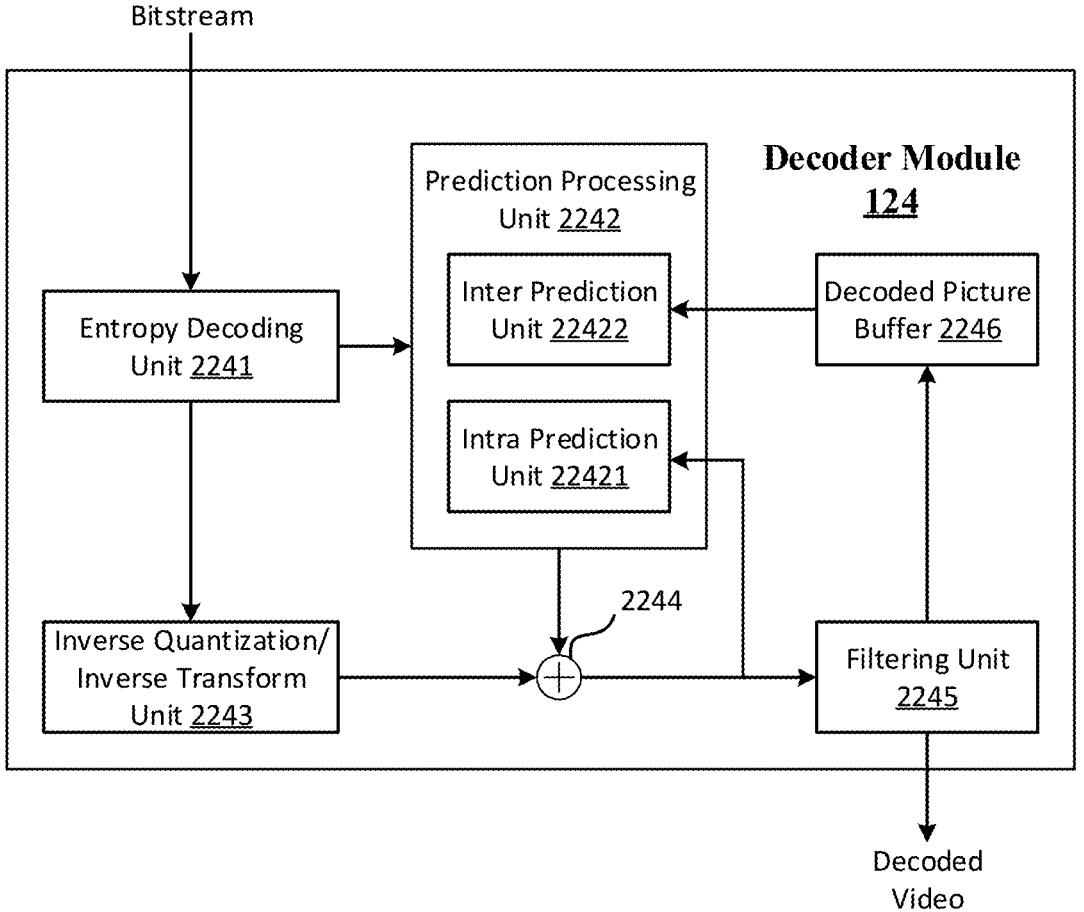
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame, as the current block unit, based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (are not explicitly illustrated for brevity of the description) may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any one of a variety of memory devices, such as a dynamic random-access memory (DRAM), including synchronous DRAM (SDRAM), magneto-resistive RAM (MRAM), resistive RAM (RRAM), or other types of memory devices. The decoded picture buffer 2246 may be on-chip along with other components of the decoder module 124 or may be off-chip relative to those components.

FIG. 3 is a flowchart illustrating a method/process 300 for decoding and/or encoding video data by an electronic device, in accordance with one or more example implementations of this disclosure. The method/process 300 is an example implementation, as there may be a variety of mechanisms of decoding the video data.

The method/process 300 may be performed by an electronic device using the configurations illustrated in FIGS. 1 and/or 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus the order may be different from what is illustrated. Additional blocks may be added or fewer blocks may be utilized without departing from the scope of the present disclosure.

At block 310, the method/process 300 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126.

At block 320, the decoder module 124 may determine, from a current frame included in the video data, a chroma block unit and a luma reconstruction block, the luma reconstruction block being collocated with the chroma block unit and reconstructed in bi-predictive intra block copy (IBC) mode.

With reference to FIGS. 1 and 2, the decoder module 124 may determine the image frames included in the bitstream when the video data, received by the decoder module 124, includes the bitstream. The current frame may be one of the image frames, determined according to the bitstream. The decoder module 124 may further divide the current frame to determine the block unit, according to the partition indications in the bitstream. In some implementations, the decoder module 124 may divide the current frame to generate multiple CTUs, and may further divide a current CTU, included in the CTUs, to generate multiple divided blocks and to determine the block unit from the divided blocks, according to the partition indications (e.g., based on any video coding standard). In some other implementations, the decoder module 124 may divide the current frame to generate multiple slices, and further divide a current slice, included in the slices, to generate multiple CTUs. In addition, the decoder module 124 may further divide a current CTU, included in the CTUs, to generate multiple divided blocks and to determine the block unit from the divided blocks, according to the partition indications. The size of the block unit may be Wb×Hb. In some implementations, each of the Wb and Hb may be a positive integer (e.g., 4, 8, etc.) that may be equal to, or different from, each other.

The block unit may include a luma block unit and a chroma block unit. Since the luma block unit may be reconstructed based on the luma block vector prior to the reconstruction of the chroma block unit, the luma block vector may be determined for predicting and reconstructing the luma block unit of the block unit prior to the reconstruction of the chroma block unit.

Figures 4A, 4B:
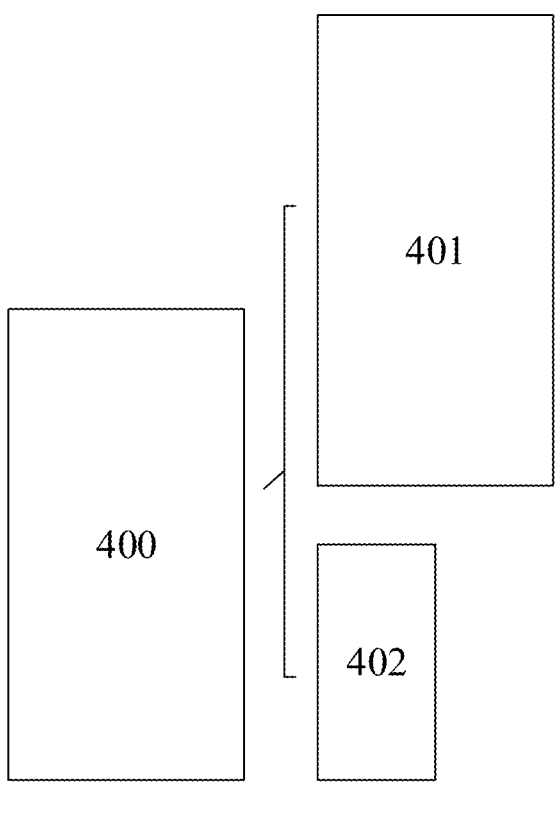
FIGS. 4A and 4B are schematic illustrations of a block unit including a luma block unit and a chroma block unit, in accordance with one or more example implementations of this disclosure.

FIGS. 4A and 4B are schematic illustrations of a block unit including a luma block unit 401 and a chroma block unit 402, in accordance with one or more example implementations of this disclosure. FIG. 4A illustrates the chroma block unit 402 and the luma block unit 401 co-located with the chroma block unit 402. The luma block unit 401 and the chroma block unit 402 may be included in the block unit 400. Since the luma block unit 401 may be reconstructed prior to the reconstruction of the chroma block unit 402, prediction information of the luma block unit 401 may be determined for predicting and reconstructing the luma block unit 401 of the block unit 400 prior to the reconstruction of the chroma block unit 402. Thus, the chroma block unit 402 may be allowed to be predicted and/or reconstructed based on the prediction information of the luma block unit 400.

At least one luma block unit may be collocated with the chroma block unit. In some implementations, the number of the at least one luma block unit may be equal to one when the chroma block unit is included in a single-tree block unit, determined from the current frame. As shown in FIG. 4A, the block unit 400 include one luma block unit 401 and one chroma block unit 402. The size of the luma block unit 401 may be identical to the size of the block unit 400. Thus, the size of the luma block unit 401 may also be Wb×Hb. The size of the chroma block unit 402 may be identical to, or proportional to, the size of the luma block unit 401.

The size of the chroma block unit 402 may be determined based on a scaling factor. The scaling factor may be determined based on a video format. In some implementations, if the video format is YUV422, the scaling factor may further include a width scaling factor equal to 2 and a height scaling factor equal to 1. Thus, the width of the luma block unit may be double the width of the chroma block unit, and the height of the luma block unit may be equal to the height of the chroma block unit. In some other implementations, if the video format is YUV420, the scaling factor may further include the width scaling factor and the height scaling factor both equal to 2. Thus, as shown in FIG. 4A, the width of the luma block unit 401 may be double the width of the chroma block unit 402, and the height of the luma block unit 401 may also be double the height of the chroma block unit 402.

In some other implementations, the number of the at least one luma block unit may be equal to, or greater than, one when the chroma block unit is included in a dual-tree block unit, determined from the current frame. FIG. 4B illustrates multiple luma block units included in a luma co-located block 4010 and co-located with the chroma block unit 402, illustrated in FIG. 4A. As shown in FIG. 4B, there may be ten luma block units in the luma co-located block 4010. In order to predict the chroma block unit 402, the decoder module 124 may determine a part of the prediction information of the luma block units for deriving multiple chroma prediction candidates. In some implementations, the decoder module 124 may determine multiple candidate positions, and select multiple luma coded blocks from the luma block units based on the candidate positions for deriving the chroma prediction candidates. In some implementations, the number of the candidate positions may be a positive integer, such as 3, 4, 5, or 6. In some implementations, the candidate positions may include at least one of a top-left position 4001, a top-right position 4002, a center position 4003, a bottom-left position 4004, or a bottom-right position 4005 of the luma co-located block 4010. It should be noted that the candidate positions in the luma co-located block 4010 may be changed without departing from the scope of the present disclosure.

Each of the luma coded blocks may include at least one of multiple candidate samples. The candidate samples may be located, respectively, at one of the candidate positions. In some implementations, as shown in FIG. 4B, the luma coded block 4011 may include the candidate sample, located at the top-left position 4001, and the luma coded block 4012 may include the candidate sample, located at the top-right position 4002. In addition, the luma coded block 4013 may include the candidate sample, located at the center position 4003, the luma coded block 4014 may include the candidate sample, located at the bottom-left position 4004, and the luma coded block 4015 may include the candidate sample, located at the bottom-right position 4005. In some other implementations, one of the luma coded blocks may include two candidate samples, respectively, located at the top-left position 4001 and the top-right position 4002.

The decoder module 124 may reconstruct the luma block units in the luma co-located block 4010 using multiple luma prediction schemes. The luma prediction schemes of the luma block units may be identical to, or different from, each other. For examples, the luma prediction scheme of the luma coded block 4011 may be different from the luma prediction schemes of the other luma block units in the luma co-located block 4010, or identical to at least one of the other luma block units in the luma co-located block 4010. The decoder module 124 may derive the chroma prediction candidates based on the prediction information of the luma coded blocks.

When at least one of the luma coded blocks in the luma co-located block 4010 is reconstructed in the bi-predictive intra block copy (IBC) mode, the decoder module 124 may determine a luma reconstruction block from the at least one of the luma coded blocks. The prediction information of the luma reconstruction block may be used to derive at least one of the chroma prediction candidates by the decoder module 124. When the number of the at least one of the luma coded blocks, reconstructed in the bi-predictive IBC mode, is greater than one, the decoder module 124 may determine multiple luma reconstruction blocks from the luma coded blocks, reconstructed in the bi-predictive IBC mode. The prediction information of the luma reconstruction blocks may be used to derive the chroma prediction candidates by the decoder module 124.

Referring back to FIG. 3, at block 330, the decoder module 124 may derive at least one bi-predictive-IBC-based candidate of the chroma block unit based on two luma block vectors used to reconstruct the luma reconstruction block in the bi-predictive IBC mode.

With reference to FIGS. 1 and 2, the decoder module 124 may derive the chroma prediction candidates based on the prediction information of the luma coded blocks to generate the chroma candidate list. The chroma prediction candidates in the chroma candidate list may include one or more of multiple uni-predictive-based candidates or multiple bi-predictive-based candidates.

In some implementations, when a specific one of the luma coded blocks is reconstructed in one of multiple uni-predictive candidate modes, the decoder module 124 may derive one of the uni-predictive-based candidates based on the prediction information of the specific luma coded block. The uni-predictive candidate modes may include a uni-predictive inter mode, and a uni-predictive intra mode. The uni-predictive inter mode may further include a uni-predictive inter merge mode, a uni-predictive inter advanced motion vector prediction (AMVP) mode, and a uni-predictive merge mode with motion vector difference (MMVD) mode. The uni-predictive intra mode may include a DC mode, a Planar mode, multiple intra angular modes, and a unit-predictive IBC mode. Additional uni-predictive candidate modes may be added or fewer uni-predictive candidate modes may be utilized without departing from the scope of the present disclosure. It should be noted that the uni-predictive candidate modes may be changed without departing from the scope of the present disclosure. For example, when the specific luma coded block is reconstructed based on one of the intra angular modes in the uni-predictive intra mode, the decoder module 124 may derive one of the uni-predictive-based candidates based on the one of the intra angular modes of the specific luma coded block.

In some other implementations, when a specific one of the luma coded blocks is reconstructed in one of multiple bi-predictive candidate modes, the decoder module 124 may derive at least one of the bi-predictive-based candidates based on the prediction information of the specific luma coded block. The bi-predictive candidate modes may include a bi-predictive inter mode, and a bi-predictive intra mode. The bi-predictive inter mode may further include a bi-predictive inter merge mode, a bi-predictive inter AMVP mode, and a bi-predictive MMVD mode. The bi-predictive intra mode may be used to predict a coding block based on two of the DC mode, the Planar mode, and the intra directional modes, or based on two luma block vector (e.g., in the bi-predictive IBC mode).

Additional bi-predictive candidate modes may be added or fewer bi-predictive candidate modes may be utilized without departing from the scope of the present disclosure. It should be noted that the bi-predictive candidate modes may be changed without departing from the scope of the present disclosure.

In some implementations, when the luma coded block that is reconstructed based on the two luma block vectors in the bi-predictive IBC mode is determined as the luma reconstruction block, the decoder module 124 may derive the at least one bi-predictive-IBC-based candidate based on the two luma block vectors of the luma reconstruction block. Each of the at least one bi-predictive-IBC-based candidate, derived based on the prediction information of the luma reconstruction block reconstructed in the bi-predictive IBC mode, may be included in the bi-predictive-based candidates, derived based on the prediction information of the luma coded blocks reconstructed in the bi-predictive candidate modes.

In some implementations, the number of the at least one bi-predictive-IBC-based candidate, derived based on the prediction information of the luma reconstruction block, may be equal to two. Thus, each of the two bi-predictive-IBC-based candidates, derived based on the prediction information of the luma reconstruction block, may be derived based on a corresponding one of the two luma block vectors, used to reconstruct the luma reconstruction block.

In some other implementations, the number of the at least one bi-predictive-IBC-based candidate, derived based on the prediction information of the luma reconstruction block, may be equal to one. Thus, the bi-predictive-IBC-based candidate, derived based on the prediction information of the luma reconstruction block, may be derived based on only one of the two luma block vectors, used to reconstruct the luma reconstruction block. For example, the at least one bi-predictive-IBC-based candidate may be derived only based on a predefined one of the two luma block vectors when the number of the at least one bi-predictive-IBC-based candidate, derived based on the prediction information of the luma reconstruction block, is equal to one. In some implementations, the predefined one of the two luma block vectors may be the first one of the two luma block vectors. In some other implementations, the predefined one of the two luma block vectors may be the second one of the two luma block vectors.

In some implementations, a specific one of the at least one bi-predictive-IBC-based candidate may include a chroma block vector derived based on a specific one of the two luma block vectors corresponding to the specific bi-predictive-IBC-based candidate, when the specific bi-predictive-IBC-based candidate is derived in direct block vector (DBV) mode. The specific bi-predictive-IBC-based candidate may be derived based on the specific luma block vector. The chroma block vector of the specific bi-predictive-IBC-based candidate may be proportional to the specific luma block vector corresponding to the specific bi-predictive-IBC-based candidate. The proportion between the specific luma block vector and the chroma block vector may be determined based on a scaling factor. The scaling factor may be determined based on a video format. For example, if the video format is YUV422, the scaling factor may further include a width scaling factor equal to 2 and a height scaling factor equal to 1. Thus, the horizontal component of the specific luma block vector may be double the horizontal component of the chroma block vector, and the vertical component of the specific luma block vector may be equal to the vertical component of the chroma block vector.

Figure 5:
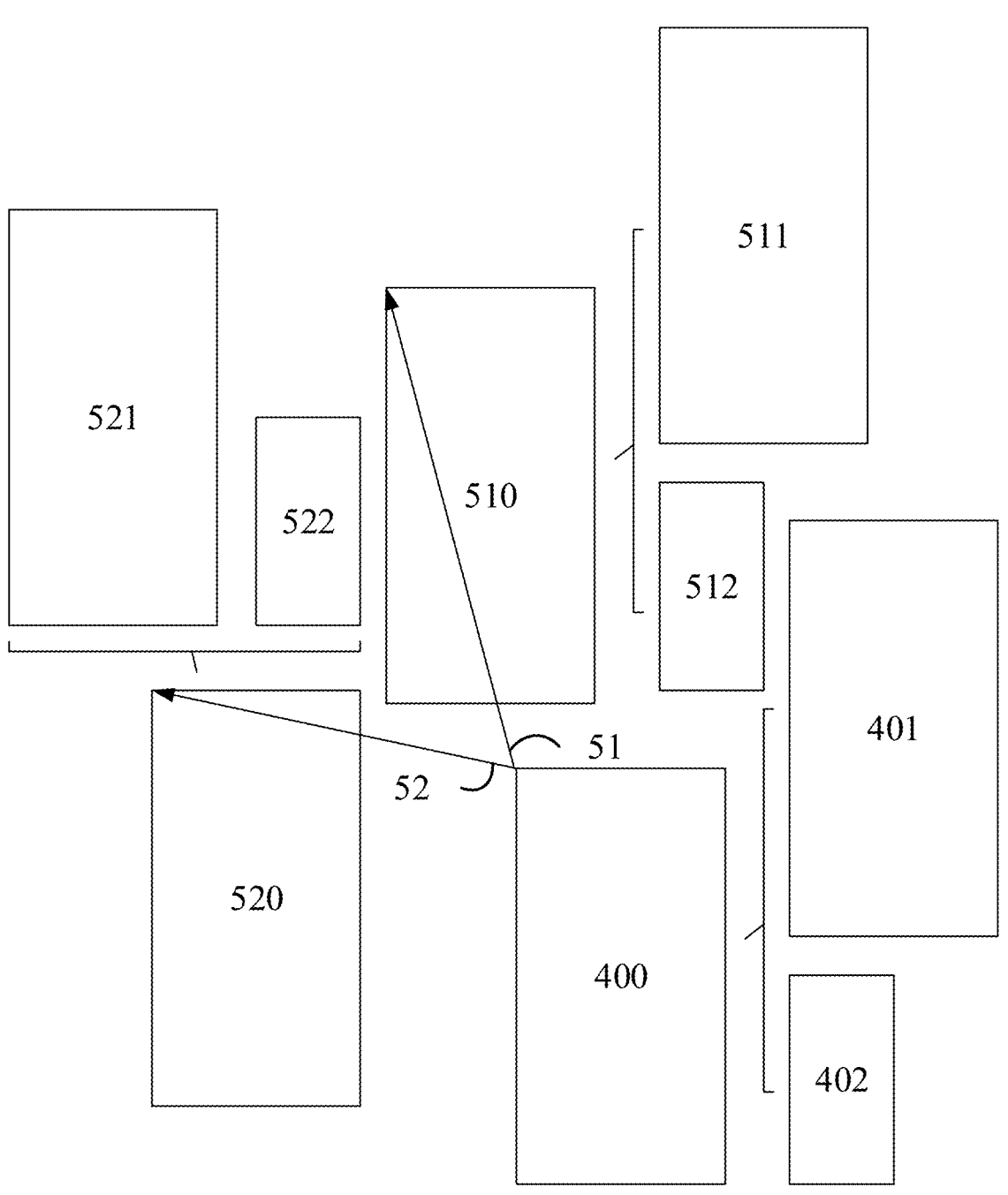
FIG. 5 is a schematic illustration of a block unit and two reference blocks, respectively, indicated by two block vectors, in accordance with one or more example implementations of this disclosure.

FIG. 5 is a schematic illustration of a block unit 400 and two reference blocks, respectively, indicated by two block vectors, in accordance with one or more example implementations of this disclosure. The block unit 400 may include the luma block unit 401 and the chroma block unit 402. A first reference block 510 indicated by a first block vector 51 may include a first luma reference block 511 and a first chroma reference block 512. A second reference block 520 indicated by a second block vector 52 may include a second luma reference block 521 and a second chroma reference block 522. The block unit 400, the first reference block 510, and the second reference block 520 may be included in the current frame. In some implementations, the first block vector 51 and the second block vector 52 may be used to reconstruct the luma reconstruction block, included in the luma block unit 401, in the bi-predictive IBC mode.

The first luma reference block 511 may be indicated by a first luma block vector. The first luma block vector may be identical to the first block vector 51 of the luma reconstruction block, reconstructed in the bi-predictive IBC mode. The first chroma reference block 512 may be indicated by a first chroma block vector. The first chroma block vector may be proportional to the first luma block vector, corresponding to the first reference block 510. The proportion between the first luma block vector and the first chroma block vector may be determined based on the scaling factor. The first chroma block vector may be included in one of the at least one bi-predictive-IBC-based candidate.

The second luma reference block 521 may be indicated by a second luma block vector. The second luma block vector may be identical to the second block vector 52 of the luma reconstruction block, reconstructed in the bi-predictive IBC mode. The second chroma reference block 522 may be indicated by a second chroma block vector. The second chroma block vector may be proportional to the second luma block vector, corresponding to the second reference block 520. The proportion between the second luma block vector and the second chroma block vector may be determined based on the scaling factor. The second chroma block vector may be included in one of the at least one bi-predictive-IBC-based candidate.

In some other implementations, a specific one of the at least one bi-predictive-IBC-based candidate may include a chroma intra prediction mode, derived based on a mode reference block indicated by a specific one of the two luma block vectors corresponding to the specific bi-predictive-IBC-based candidate, when the specific bi-predictive-IBC-based candidate is derived in chroma direct mode (DM). The mode reference block, indicated by the specific luma block vector corresponding to the specific bi-predictive-IBC-based candidate, may be reconstructed based on a luma intra prediction mode prior to the reconstruction of the chroma block unit. The specific bi-predictive-IBC-based candidate may be derived based on the luma intra prediction mode of the mode reference block corresponding to the specific bi-predictive-IBC-based candidate.

The luma intra prediction mode of the mode reference block may be selected from multiple luma intra default modes in the intra mode. The luma intra default modes may include multiple luma non-angular modes and multiple luma angular modes. The luma non-angular modes may include the Planar mode and the DC mode. In addition, the number of the luma angular modes may be equal to 32 for the method 300 when the decoder module 124 decodes the block unit in high efficiency video coding (HEVC). The number of the luma angular modes may be equal to 65 for the method 300 when the decoder module 124 decodes the block unit in versatile video coding (VVC) or VVC test model (VTM). Thus, the number of the luma intra default modes may be equal to 34 for the method 300 in HEVC, and the number of the luma intra default modes may be equal to 67 for the method 300 in VVC or VTM. Additional luma angular modes may be added or fewer luma angular modes may be utilized without departing from the scope of the present disclosure. It should be noted that the luma angular modes may be changed without departing from the scope of the present disclosure.

The chroma intra prediction mode of the specific bi-predictive-IBC-based candidate may be selected from multiple chroma intra default modes in intra mode based on the luma intra prediction mode of the mode reference block. The chroma intra default modes may include multiple chroma non-angular modes and multiple chroma angular modes. The chroma non-angular modes may include the Planar mode and the DC mode. In some implementations, the chroma angular modes may be identical to the luma angular mode. In some other implementations, the chroma angular modes may include only a portion of the luma angular modes. For example, the chroma angular modes may only include a vertical mode, a horizontal mode, and a top-right mode. In some implementations, the chroma intra prediction mode of the specific bi-predictive-IBC-based candidate may be identical to the luma intra prediction mode of the mode reference block. In some other implementations, the chroma intra prediction mode of the specific bi-predictive-IBC-based candidate may be determined from a look-up table based on the luma intra prediction mode of the mode reference block.

As shown in FIG. 5, when the first luma reference block 511, indicated by the first block vector 51 of the luma reconstruction block reconstructed in the bi-predictive IBC mode, is reconstructed based on the first luma intra prediction mode, the first luma intra prediction mode may be used to derive the first chroma intra prediction mode in one of the at least one bi-predictive-IBC-based candidate of the chroma block unit 402. In addition, when the second luma reference block 521, indicated by the second block vector 52 of the luma reconstruction block reconstructed in the bi-predictive IBC mode, is also reconstructed based on the second luma intra prediction mode, the second luma intra prediction mode may be used to derive the second chroma intra prediction mode in another one of the at least one bi-predictive-IBC-based candidate of the chroma block unit 402. In some implementations, the first luma intra prediction mode may be different from, or identical to the second luma intra prediction mode.

In yet some other implementations, a specific one of the at least one bi-predictive-IBC-based candidate may include a chroma prediction model, derived based on a model reference block indicated by a specific one of the two luma block vectors corresponding to the specific bi-predictive-IBC-based candidate, when the specific bi-predictive-IBC-based candidate is derived in block-vector-guided convolutional cross-component model (BVG-CCCM) mode. The model reference block indicated by the specific luma block vector corresponding to the specific bi-predictive-IBC-based candidate may include a luma model reference block and a chroma model reference block. The chroma prediction model may be derived based on the luma model reference block and the chroma model reference block. The size of the chroma model reference block may be identical to the size of the luma model reference block. In addition, the size of the luma model reference block may be identical to, or greater than, the size of the chroma block unit.

The chroma prediction model of the chroma block unit may be generated by deriving multiple model coefficients of a predefined chroma model based on the luma model reference block and the chroma model reference block. Thus, a first chroma prediction model of the chroma block unit may be generated by deriving multiple first model coefficients of the predefined chroma model based on a first luma model reference block and a first chroma model reference block, determined based on the first luma block vector 51 of the luma reconstruction block reconstructed in the bi-predictive IBC mode. In addition, a second chroma prediction model of the chroma block unit may be generated by deriving multiple second model coefficients of the predefined chroma model based on a second luma model reference block and a second chroma model reference block, determined based on the second luma block vector 52 of the luma reconstruction block reconstructed in the bi-predictive IBC mode.

In some implementations, the predefined chroma model may be a quadratic equation. The quadratic equation may include Ns luma spatial sample terms, Np non-linear terms and one bias term B. The number Ns may be a positive integer, such as 3, 4, 5, 6, 7, 8, or 9. The number Np may also be a positive integer, such as 3, 4, 5, 6, 7, 8, or 9. In some implementations, the quadratic equation including five luma spatial sample terms, five non-linear terms and one bias term B may be used in BVG-CCCM mode. The five luma spatial sample terms may include the center sample C, the north sample N, the south sample S, the west sample W, and the east sample E. Thus, the predefined chroma model may be shown in the following functions:

$$predChromaVal = c_0 \times C + c_1 \times N + c_2 \times S + c_3 \times E + c_4 \times W +$$
$$c_5 \times P(C) + c_6 \times P(N) + c_7 \times P(S) + c_8 \times P(E) + c_9 \times P(W) + c_{10} \times B$$

where the coefficients $c_0$-$c_{10}$ are ten filter coefficients for the luma spatial sample terms C, N, S, W, and E, the non-linear terms, and the bias term B, and predChromaVal may be a predicted chroma sample located at a sample position (x, y) relative to a top-left chroma sample of the chroma block unit 402. In addition, P may be the non-linear term P (Q) equal to (Q×Q+midVal)>>bitDepth, and B may be the bias term equal to $2^{bitDepth}$−1. The parameter midVal and the bias term B may be set as to a middle luma value, the parameter bitDepth may be a bit depth of the samples in the bitstream. For example, the bias term B may be set as 512 for 10 bits content.

Referring back to FIG. 3, at block 340, the decoder module 124 may reconstruct the chroma block unit based on the at least one bi-predictive-IBC-based candidate. With reference to FIGS. 1 and 2, the decoder module 124 may reconstruct the chroma block unit based on the chroma prediction candidates in the chroma candidate list. The chroma prediction candidates may include the one or more of the uni-predictive-based candidates or the bi-predictive-based candidates in the chroma candidate list. The bi-predictive-based candidates may include the at least one bi-predictive-IBC-based candidate.

In some implementations, the decoder module 124 may determine an arrangement of the chroma prediction candidates based on multiple template cost values, and select all or a portion of the chroma prediction candidates based on the determined arrangement of the chroma prediction candidates to generate a chroma reordered list.

The decoder module 124 may determine a chroma template region neighboring the chroma block unit in the current frame. The chroma template region may include at least one of a first block adjacent region, located at a left side of the block unit, a second block adjacent region, located above the block unit, a third block adjacent region, located at a top-left side of the block unit, a fourth block adjacent region, located at a bottom-left side of the block unit, and a fifth block adjacent region, located at an above-right side of the block unit. Since the first to the fifth block adjacent regions may be reconstructed prior to the reconstruction of the block unit, the chroma template region may be reconstructed prior to the reconstruction of the block unit. Thus, the decoder module 124 may be allowed to directly determine a chroma template reconstruction of the chroma template region when the block unit is being predicted and/or reconstructed. In some implementations, the size of the chroma template region may be determined based on the size of the block unit.

The decoder module 124 may predict the chroma template region using the chroma prediction candidates to generate multiple chroma template predictions. Since the chroma prediction candidates includes the one or more of the uni-predictive-based candidates or the bi-predictive-based candidates, the decoder module 124 may predict the chroma template region using the one or more of the uni-predictive-based candidates or the bi-predictive-based candidates to generate one or more of the chroma template predictions. The decoder module 124 may determine the template cost values by comparing each of the chroma template predictions with the chroma template reconstruction of the chroma template region. For example, one of the template cost values may be generated by a comparison between a chroma template reconstruction of the chroma template region and a corresponding one of the chroma template predictions.

The difference between each of the chroma template predictions and the chroma template reconstruction of the chroma template region may be calculated based on a Mean Squared Error (MSE) calculation. In addition, the difference between each of the chroma template predictions and the chroma template reconstruction of the chroma template region may be calculated based on one of a Sum of Squared Error (SSE) calculation, a Mean Absolute Difference (MAD) calculation, a Sum of Absolute Difference (SAD) calculation, a Sum of Absolute Transformed Difference (SATD) calculation, and a mean-removed sum of absolute difference (MR-SAD) calculation.

The decoder module 124 may reorder the chroma prediction candidates based on the determined arrangement to generate the chroma reordered list. In some implementations, the chroma prediction candidates may be reordered in an ascending order or a descending order of the template cost values. In some implementations, the number of the chroma prediction candidates in the chroma reordered list may be equal to, or less than, the number of the chroma prediction candidates in the chroma candidate list.

Before the arrangement is determined based on the template cost values, the chroma prediction candidates may be ordered based on one or more arbitrary rules. The chroma prediction candidates may be reordered in the ascending order of the template cost values. Thus, when the template cost value of a specific one of the chroma prediction candidates is less than the template cost values of the other chroma prediction candidates, the specific chroma prediction candidate may be moved forward to be a first chroma prediction candidate based on the determined arrangement. In other words, the specific chroma prediction candidate may be moved to be the first chroma prediction candidate when the template cost value of the specific chroma prediction candidate is the minimum value of the template cost values.

The decoder module 124 may select a chroma prediction mode from the chroma candidate list, and predict the chroma block unit using the selected chroma prediction mode to generate a predicted chroma block for reconstructing the chroma block unit. The decoder module 124 may select the chroma prediction mode from the chroma candidate list based on the template cost values, and reconstruct the chroma block unit based on the selected chroma prediction mode. For example, the decoder module 124 may select one of the one or more of the uni-predictive-based candidates or the bi-predictive-based candidates based on the one or more template cost values corresponding to the one or more of the uni-predictive-based candidates or the bi-predictive-based candidates. Then, the decoder module 124 may reconstruct the chroma block unit based on the selected one of the one or more of the uni-predictive-based candidates or the bi-predictive-based candidates.

In some implementations, the decoder module 124 may select the chroma prediction mode from the chroma prediction candidates in the chroma reordered list based on a chroma prediction index of the block unit. The chroma prediction index may be determined from the bitstream for the block unit. In some other implementations, the decoder module 124 may directly determine the first chroma prediction candidate in the chroma reordered list as the chroma prediction mode without parsing the chroma prediction index from the bitstream. Thus, the chroma prediction index may be excluded from the bitstream. When the chroma prediction candidates are reordered in the ascending order of the template cost values to generate the chroma reordered list, the first chroma prediction candidate in the chroma reordered list may be the chroma prediction candidate having the minimum value of the template cost values. In some other implementations, the decoder module 124 may directly select, from the chroma candidate list, a specific the chroma prediction candidates having the minimum value of the template cost values without reordering the chroma prediction candidates in the chroma candidate list and without parsing the chroma prediction index from the bitstream.

In yet some other implementations, the decoder module 124 may select the chroma prediction mode directly from the chroma prediction candidates in the chroma candidate list based on the chroma prediction index of the block unit. In other words, the decoder module 124 may determine the chroma prediction mode without calculating the template cost values. Thus, the decoder module 124 may determine, from the bitstream, the chroma prediction index, indicating one of the one or more of the uni-predictive-based candidates or the bi-predictive-based candidates in the chroma candidate list, and reconstruct the chroma block unit based on the indicated one of the one or more of the uni-predictive-based candidates or the bi-predictive-based candidates.

When the block unit is also a bi-predictive coding block, the decoder module 124 may select two chroma prediction modes from the chroma prediction candidates in the chroma candidate list. For example, the decoder module 124 may select the two chroma prediction modes from the one or more of the uni-predictive-based candidates or the bi-predictive-based candidates. In some implementations, the decoder module 124 may select the two chroma prediction modes from the chroma prediction candidates in the chroma candidate list or the chroma reordered list based on two chroma prediction indices. In some other implementations, the decoder module 124 may select the first two chroma prediction modes from the chroma reordered list without parsing the two chroma prediction indices from the bitstream.

The decoder module 124 may predict the chroma block unit using the two chroma prediction modes to generate two chroma prediction blocks, and weightedly combine the two chroma prediction blocks based on two weighting parameters to generate a weighted block, as the predicted chroma block for reconstructing the chroma block unit. In some implementations, the weighting parameters may be predefined. For examples, the value of both of the two weighting parameters may be equal to 0.5. In some other implementations, the two weighting parameters may be derived based on the template cost values of the two chroma prediction modes. Thus, the decoder module 124 may weightedly combine the two chroma prediction blocks based on the two derived weighting parameters to generate the weighted block, and to reconstruct the chroma block unit based on the weighted block. The template cost values of the two chroma prediction modes may be TC1 and TC2. The weighting parameter of the first one of the two chroma prediction modes may be equal to $TC2/(TC1+TC2)$. In addition, the weighting parameter of the second one of the two chroma prediction modes may be equal to $TC1/(TC1+TC2)$.

The chroma candidate list may only include at least one bi-predictive-IBC-based candidate, derived in DBV mode. Thus, the chroma reordered list may also only include the at least one bi-predictive-IBC-based candidate, derived in DBV mode. In some implementations, the decoder module 124 may directly select a predefined one of the at least one bi-predictive-IBC-based candidate, derived in DBV mode, as the chroma prediction mode. For example, the decoder module 124 may directly select the first one of the at least one bi-predictive-IBC-based candidate, derived in DBV mode, in the chroma candidate list as the chroma prediction mode. In some implementations, the decoder module 124 may select the chroma prediction mode from the at least one bi-predictive-IBC-based candidate, derived in DBV mode, in the chroma candidate list or the chroma reordered list based on the chroma prediction index. In some other implementations, the decoder module 124 may directly determine the first one of the at least one bi-predictive-IBC-based candidate, derived in DBV mode, in the chroma reordered list as the chroma prediction mode without parsing the chroma prediction index from the bitstream. In yet some other implementations, the decoder module 124 may weightedly combine the two chroma prediction blocks based on the two weighting parameters when the number of the at least one bi-predictive-IBC-based candidate, derived in DBV mode, is equal to two. The weighting parameters may be predefined, or determined based on the template cost values of the two bi-predictive-IBC-based candidates, derived in DBV mode.

The chroma candidate list may only include at least one bi-predictive-IBC-based candidate, derived in DM mode. Thus, the chroma reordered list may also only include the at least one bi-predictive-IBC-based candidate, derived in DM mode. In some implementations, the decoder module 124 may directly select a predefined one of the at least one bi-predictive-IBC-based candidate, derived in DM mode, as the chroma prediction mode. For example, the decoder module 124 may directly select the first one of the at least one bi-predictive-IBC-based candidate, derived in DM mode, in the chroma candidate list as the chroma prediction mode. In some implementations, the decoder module 124 may select the chroma prediction mode from the at least one bi-predictive-IBC-based candidate, derived in DM mode, in the chroma candidate list or the chroma reordered list based on the chroma prediction index. In some other implementations, the decoder module 124 may directly determine the first one of the at least one bi-predictive-IBC-based candidate, derived in DM mode, in the chroma reordered list as the chroma prediction mode without parsing the chroma prediction index from the bitstream. In yet some other implementations, the decoder module 124 may weightedly combine the two chroma prediction blocks based on the two weighting parameters when the number of the at least one bi-predictive-IBC-based candidate, derived in DM mode, is equal to two. The two weighting parameters may be predefined, or determined based on the template cost values of the two bi-predictive-IBC-based candidates, derived in DM mode.

The chroma candidate list may only include at least one bi-predictive-IBC-based candidate, derived in BVG-CCCM mode. Thus, the chroma reordered list may also only include the at least one bi-predictive-IBC-based candidate, derived in BVG-CCCM mode. In some implementations, the decoder module 124 may directly select a predefined one of the at least one bi-predictive-IBC-based candidate, derived in BVG-CCCM mode, as the chroma prediction mode. For example, the decoder module 124 may directly select the first one of the at least one bi-predictive-IBC-based candidate, derived in BVG-CCCM mode, in the chroma candidate list as the chroma prediction mode. In some implementations, the decoder module 124 may select the chroma prediction mode from the at least one bi-predictive-IBC-based candidate, derived in BVG-CCCM mode, in the chroma candidate list or the chroma reordered list based on the chroma prediction index. In some other implementations, the decoder module 124 may directly determine the first one of the at least one bi-predictive-IBC-based candidate, derived in BVG-CCCM mode, in the chroma reordered list as the chroma prediction mode without parsing the chroma prediction index from the bitstream. In yet some other implementations, the decoder module 124 may weightedly combine the two chroma prediction blocks based on the two weighting parameters when the number of the at least one bi-predictive-IBC-based candidate, derived in BVG-CCCM mode, is equal to two. The two weighting parameters may be predefined, or determined based on the template cost values of the two bi-predictive-IBC-based candidates, derived in BVG-CCCM mode.

The decoder module 124 may reconstruct the block unit based on the predicted chroma block. The decoder module 124 may determine multiple chroma residual components of a chroma residual block from the bitstream for the block unit and add the chroma residual components into the predicted chroma block to reconstruct the chroma block unit.

The decoder module 124 may reconstruct all of the other block units in the image frame for reconstructing the image frame and the video. The method/process 300 may then end.

Figure 6:
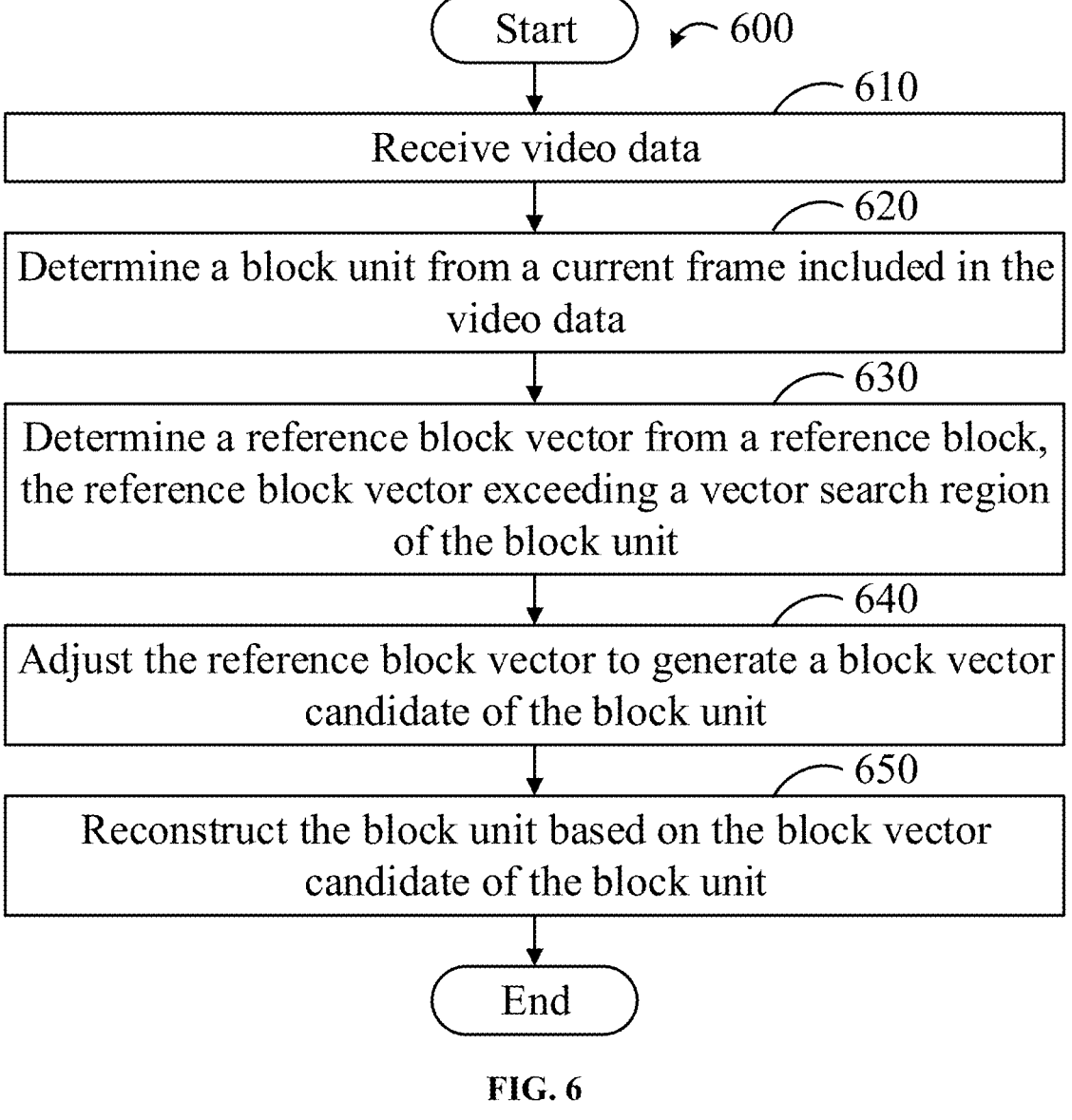
FIG. 6 is a flowchart illustrating a method/process for decoding and/or encoding video data by an electronic device, in accordance with one or more example implementations of this disclosure.

FIG. 6 is a flowchart illustrating a method/process 600 for decoding and/or encoding video data by an electronic device, in accordance with one or more example implementations of this disclosure. The method/process 600 is an example implementation, as there may be a variety of mechanisms of decoding the video data.

The method/process 600 may be performed by an electronic device using the configurations illustrated in FIGS. 1 and/or 2, where various elements of these figures may be referenced to describe the method/process 600. Each block illustrated in FIG. 6 may represent one or more processes, methods, or subroutines performed by an electronic device.

The order in which the blocks appear in FIG. 6 is for illustration only, and may not be construed to limit the scope of the present disclosure, thus the order may be different from what is illustrated. Additional blocks may be added or fewer blocks may be utilized without departing from the scope of the present disclosure.

At block 610, the method/process 600 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126.

At block 620, the decoder module 124 may determine a block unit from a current frame included in the video data.

With reference to FIGS. 1 and 2, the decoder module 124 may determine the image frames included in the bitstream when the video data, received by the decoder module 124, includes the bitstream. The current frame may be one of the image frames determined according to the bitstream. The decoder module 124 may further divide the current frame to determine the block unit, according to the partition indications in the bitstream. In some implementations, the decoder module 124 may divide the current frame to generate multiple CTUs, and may further divide a current CTU included in the CTUs to generate multiple divided blocks and to determine the block unit from the divided blocks, according to the partition indications (e.g., based on any video coding standard). In some other implementations, the decoder module 124 may divide the current frame to generate multiple slices or multiple tiles, and further divide a current slice included in the slices, or a current tile included in the tiles, to generate multiple CTUs. In addition, the decoder module 124 may further divide a current CTU included in the CTUs to generate multiple divided blocks and to determine the block unit from the divided blocks, according to the partition indications. The size of the block unit may be Wb×Hb. In some implementations, each of the Wb and Hb may be a positive integer (e.g., 4, 8, etc.) that may be equal to, or different from, each other.

At block 630, the decoder module 124 may determine a reference block vector of a reference block. In some implementations, the reference block vector may exceed a vector search region of the block unit.

With reference to FIGS. 1 and 2, the decoder module 124 may determine a vector candidate list for predicting the block unit. The vector candidate list may be derived based on multiple neighboring blocks neighboring the block unit. The neighboring blocks may be reconstructed prior to the reconstruction of the block unit. The neighboring blocks may include at least one of a first neighboring block, located above a top-right corner of the block unit, a second neighboring block, located at a left side of a bottom-left corner of the block unit, a third neighboring block, located at a top-right side of the block unit, a fourth neighboring block, located at a bottom-left side of the block unit, and a fifth neighboring block, located at a top-left side of the block unit.

When a specific one of the neighboring blocks is reconstructed based on a neighboring block vector, the specific neighboring block may be determined as a candidate block and the neighboring block vector may be used to derive a block vector candidate. The decoder module 124 may further determine a vector search region for the vector candidate list, and may derive the block vector candidate based on the vector search region and the neighboring block vector.

Figure 7A:
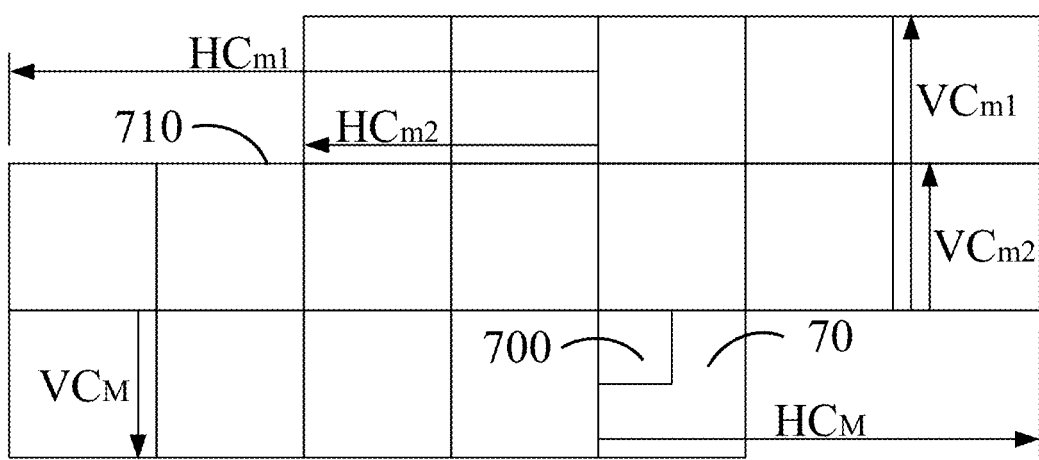
FIGS. 7A and 7B are schematic illustrations of a block unit and a vector search region, in accordance with one or more example implementations of this disclosure.
Figure 7B:
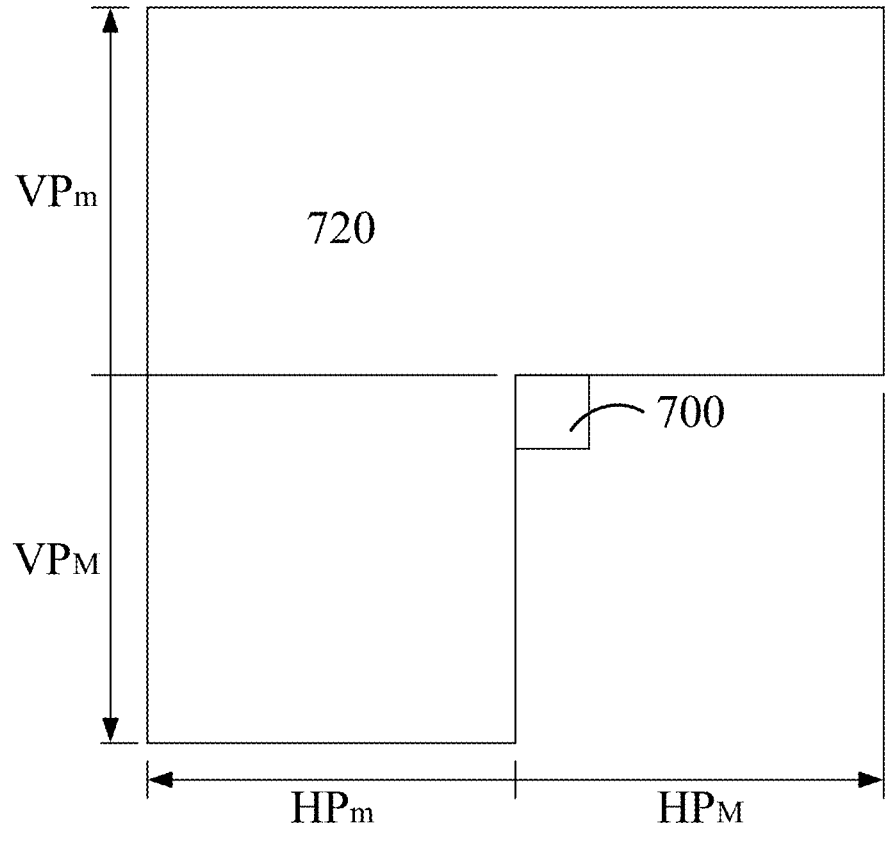

The decoder module 124 may determine whether the neighboring block vector may be within the vector search region. When the neighboring block vector is within the vector search region, the neighboring block vector may be directly determined as one of the block vector candidates in the vector candidate list. When the neighboring block vector is not within the vector search region, the neighboring block vector may be determined as the reference block vector exceeding the vector search region of the block unit. FIGS. 7A and 7B are schematic illustrations of a block unit and a vector search region, in accordance with one or more example implementations of this disclosure. Different vector candidate lists may correspond to different vector search regions.

In some implementations, the vector candidate list may include an intra block copy (IBC) candidate list. The vector search region may include an IBC vector search region. The block vector candidates in the IBC candidate list may include multiple IBC vector candidates within the IBC vector search region. FIG. 7A illustrates the block unit 700 and an IBC vector search region 710. The IBC vector search region 710 may include a part of a current CTU 70 and multiple neighboring CTUs. The IBC vector search region 710 and the current CTU may be included in an image area. The image area may be one of the current frame, the current tile, or the current slice. The size of the image area may be Wax Ha. In some implementations, each of the Wa and Ha may be greater than, or equal to, the size of the CTUs, and may be a positive integer that may be equal to, or different from, each other. Thus, the number of the CTUs in the image area may be equal to NaxNb. The number Na may be derived from dividing the Wa by the size of the CTUs, and the number Nb may be derived from dividing the Ha by the size of the CTUs.

In some implementations, when the block unit 700 is located at a top-left corner of the current CTU 70, there may be no coded block of the current CTU 70 included in the IBC vector search region 710. In other words, the current CTU 70 may be excluded from the IBC vector search region 710. In some other implementations, when the block unit 700 is not located at the top-left corner of the current CTU 70, the part of the current CTU 70, included in the IBC vector search region 710, may include multiple coded blocks located above the block unit 700, located at a left side of the block unit 700, or located at a top-left side of the block unit 700.

The neighboring CTUs included in the IBC vector search region 710 may include one or more CTU rows, located above the current CTU 70, and multiple CTU columns, located at a left side of the current CTU 70. The CTU columns, located at the left side of the current CTU 70, may be located above a bottom boundary of the current CTU 70. In some implementations, when an upper boundary of the current CTU 70 is included in an upper boundary of the image area, there may be no CTU row in the IBC vector search region 710. In other words, the one or more CTU rows may be excluded from the IBC vector search region 710. In some other implementations, when the size of the current CTU 70 is 128×128, the number of the one or more CTU row may be equal to two. In yet some other implementations, when the size of the current CTU 70 is 256×256, the number of the one or more CTU rows may be equal to one. In some implementations, when a left boundary of the current CTU 70 is included in a left boundary of the image area, there may be no CTU column in the IBC vector search region 710. In other words, the CTU columns may be excluded from the IBC vector search region 710. For example, the coordinates of the current CTU in the image area may be defined as (m, n). As shown in FIG. 7A, the coordinates of the neighboring CTUs in the IBC vector search region 710 may be defined as (m−2, n−2), . . . , (Na−1, n−2), (0, n−1), . . . , (Na−1, n−1), (0, n), . . . , and (m−1, n).

The IBC vector search region 710 may have multiple boundary values. The boundary values may include an IBC vertical maximum $VC_M$ derived from subtracting a vertical coordinate of a bottom boundary of the current CTU 70 from a vertical coordinate of the upper boundary of the current CTU 70, a first IBC vertical minimum $VC_{m1}$ derived from subtracting a vertical coordinate of an upper boundary of the IBC vector search region 710 from the vertical coordinate of the upper boundary of the current CTU 70, and a second IBC vertical minimum $VC_{m2}$ derived from subtracting a vertical coordinate of an upper boundary of a first CTU row from the vertical coordinate of the upper boundary of the current CTU 70. In addition, the boundary values may include an IBC horizontal maximum $HC_M$ derived from subtracting a horizontal coordinate of a right boundary of the IBC vector search region 710 from a horizontal coordinate of the left boundary of the current CTU 70, a first IBC horizontal minimum $HC_{m1}$ derived from subtracting a horizontal coordinate of a left boundary of the IBC vector search region 710 from the horizontal coordinate of the left boundary of the current CTU 70, and a second IBC horizontal minimum $HC_{m2}$ derived from subtracting a horizontal coordinate of a left boundary of a second CTU row from the horizontal coordinate of the left boundary of the current CTU 70.

Each of the IBC vertical maximum $VC_M$ and the IBC horizontal maximum $HC_M$ may be a positive integer. Each of the first IBC vertical minimum $VC_{m1}$, the second IBC vertical minimum $VC_{m2}$, the first IBC horizontal minimum $HC_{m1}$, and the second IBC horizontal minimum $HC_{m2}$ may be a negative integer.

In some other implementations, the vector candidate list may include an intra template matching prediction (IntraTMP) candidate list. The vector search region may include an intraTMP vector search region. The block vector candidates in the intraTMP candidate list may include multiple intraTMP vector candidates within the intraTMP vector search region. FIG. 7B illustrates the block unit 700 and an intraTMP vector search region 720. The intraTMP vector search region 720 and the current CTU may be included in the image area. The image area may be one of the current frame, the current tile, or the current slice.

The intraTMP vector search region 720 may include multiple neighboring coded regions. The neighboring coded regions may include at least one of a first coded region located above the block unit 700, a second coded region located at a left side of the block unit 700, and a third coded region located at a top-left side of the block unit 700. In some implementations, when an upper boundary of the block unit 700 is included in the upper boundary of the image area, there may be no first coded region and third coded region in the intraTMP vector search region 720. In some implementations, when a left boundary of the block unit 700 is included in the left boundary of the image area, there may be no second coded region and third coded region in the intraTMP vector search region 720.

The intraTMP vector search region 720 may also have multiple boundary values. The boundary values may be determined based on a search factor and the size Wb×Hb of the block unit 700. The search factor may further include a height search factor $F_h$ and a width search factor $F_w$. Each of the height search factor $F_h$ and the width search factor $F_w$ may be a positive integer (e.g., 2, 3, 4, 5, etc.) that may be equal to, or different from, each other. The boundary values may include an intraTMP horizontal maximum $HP_M$ derived from multiplying the width Wb of the block unit 700 by the width search factor $F_w$, and an intraTMP horizontal minimum $HP_m$ derived from multiplying the width Wb of the block unit 700 by a negative value of the width search factor $F_w$. In addition, the boundary values may further include an intraTMP vertical maximum $VP_M$ derived from multiplying the height Hb of the block unit 700 by the height search factor $F_h$, and an intraTMP vertical minimum $VP_m$ derived from multiplying the height Hb of the block unit 700 by a negative value of the height search factor Fn. Thus, each of the intraTMP horizontal maximum $HP_M$ and the intraTMP vertical maximum $VP_M$ may be a positive integer. In addition, each of the intraTMP horizontal minimum $HP_m$ and the intraTMP vertical minimum $VP_m$ may be a negative integer.

The intraTMP horizontal maximum $HP_M$ may be equal to a difference value generated by subtracting a horizontal coordinate of a right boundary of the intraTMP vector search region 720 from a horizontal coordinate of a left boundary of the block unit 700. The intraTMP horizontal minimum $HP_m$ may be equal to a difference value generated by subtracting the horizontal coordinate of the left boundary of the block unit 700 from a horizontal coordinate of a left boundary of the intraTMP vector search region 720.

The intraTMP vertical maximum $VP_M$ may be equal to a difference value generated by subtracting a vertical coordinate of a bottom boundary of the intraTMP vector search region 720 from a vertical coordinate of an upper boundary of the block unit 700. The intraTMP vertical minimum $VP_m$ may be equal to a difference value generated by subtracting the vertical coordinate of the upper boundary of the block unit 700 from a vertical coordinate of an upper boundary of the intraTMP vector search region 720.

In some implementations, the specific neighboring block may be reconstructed based on the neighboring block vector in IBC mode. Thus, the neighboring block vector, used to reconstruct the specific neighboring block in IBC mode, may be used to derive one of the IBC vector candidates in the IBC candidate list. In addition, the neighboring block vector, used to reconstruct the specific neighboring block in IBC mode, may also be used to derive one of the IntraTMP vector candidates in the IntraTMP candidate list.

In some other implementations, the specific neighboring block may be reconstructed based on the neighboring block vector in an IntraTMP mode. Thus, the neighboring block vector, used to reconstruct the specific neighboring block in IntraTMP mode, may be used to derive one of multiple IntraTMP vector candidates in the IntraTMP candidate list. In addition, the neighboring block vector, used to reconstruct the specific neighboring block in IntraTMP mode, may also be used to derive one of the IBC vector candidates in the IBC candidate list.

In some implementations, the neighboring block vector, used to derive the block vector candidate, may be determined for reconstructing the specific neighboring block. Thus, when the decoder module 124 reconstructs the specific neighboring block, the decoder module 124 may also derive a vector search region of the specific neighboring block for checking the neighboring block vector. In other words, the neighboring block vector of the specific neighboring block may be within the vector search region of the specific neighboring block. However, when the block vector candidate of the block unit is derived based on the neighboring block vector of the specific neighboring block, the neighboring block vector of the specific neighboring block may exceed the vector search region of the block unit.

Figure 8:
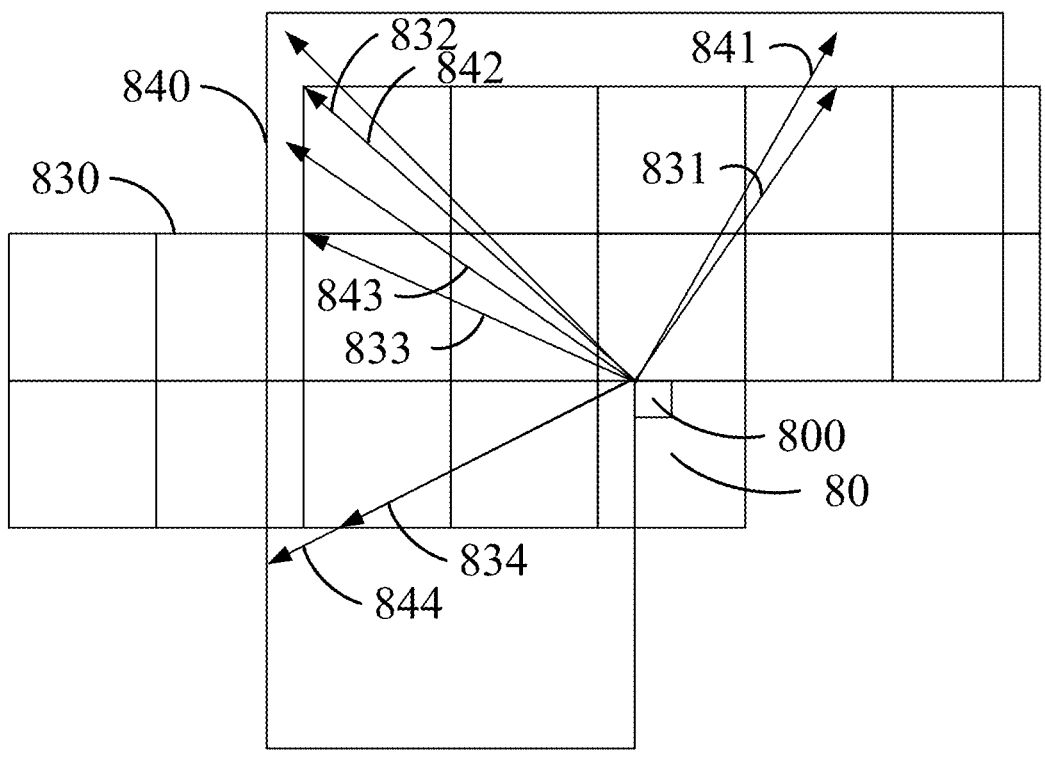
FIG. 8 is a schematic illustration of multiple neighboring intra template matching prediction (IntraTMP) vectors exceeding an IBC search region of a block unit, in accordance with one or more example implementations of this disclosure.

FIG. 8 is a schematic illustration of multiple neighboring IntraTMP vectors 841-844 exceeding an IBC search region 830 of a block unit 800, in accordance with one or more example implementations of this disclosure. Multiple neighboring blocks may be, respectively, reconstructed based on one of the neighboring block vectors in IntraTMP mode. In some implementations, the sizes of the neighboring blocks may be different from each other. Thus, the sizes of the IntraTMP search regions of the neighboring blocks may be different from each other. In some other implementations, the sizes of the neighboring blocks may be identical to each other. Thus, the sizes of the IntraTMP search regions of the neighboring blocks may be identical to each other.

When the block vector candidates of the block unit are derived based on the neighboring block vectors of the neighboring blocks, the neighboring block vectors of the neighboring blocks may be first mapped to the neighboring IntraTMP vectors 841-844 of the block unit 800. Thus, the neighboring block vectors of the neighboring blocks may be, respectively, identical to a corresponding one of the neighboring IntraTMP vectors 841-844 of the block unit 800. In some implementations, as shown in FIG. 8, the IntraTMP search regions of the neighboring blocks may also be mapped to an IntraTMP reference region 840 of the block unit 800, when the sizes of the neighboring blocks are identical to each other. In other words, each of the sizes of the IntraTMP search regions of the neighboring blocks may be identical to the size of IntraTMP reference region 840. In some other implementations, the IntraTMP search regions of the neighboring blocks may also be mapped to different IntraTMP reference regions of the block unit 800, when the sizes of the neighboring blocks are different from each other.

Furthermore, each of the neighboring block vectors of the neighboring blocks may be, respectively, within a corresponding one of the IntraTMP search regions of the neighboring blocks. Thus, the neighboring IntraTMP vectors 841-844 of the block unit 800 may also be within the IntraTMP reference region 840 of the block unit 800. However, as shown in FIG. 8, the neighboring IntraTMP vectors 841-844 of the block unit 800 may exceed the IBC search region 830 of the block unit 800. Thus, the decoder module 124 may determine the neighboring IntraTMP vectors 841-844 of the block unit 800 as the reference block vectors. The neighboring blocks corresponding to the neighboring IntraTMP vectors 841-844 of the block unit 800 may be determined as the reference blocks.

Figure 9A:
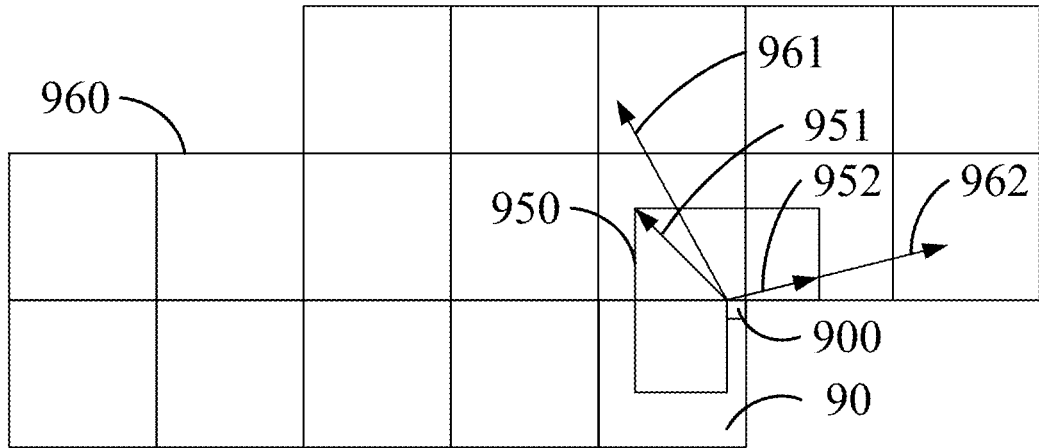
FIGS. 9A and 9B are schematic illustrations of multiple neighboring IBC vectors and multiple neighboring IntraTMP vectors exceeding an IntraTMP search region of a block unit, in accordance with one or more example implementations of this disclosure.
Figure 9B:
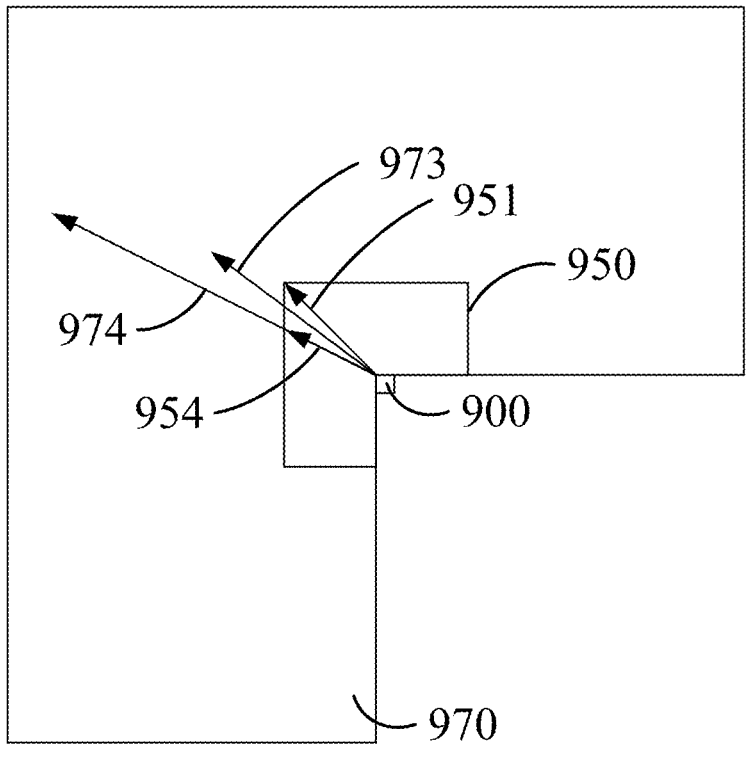

FIGS. 9A and 9B are schematic illustrations of multiple neighboring IBC vectors 961 and 962 and multiple neighboring IntraTMP vectors 973 and 974 exceeding an IntraTMP search region 950 of a block unit 900, in accordance with one or more example implementations of this disclosure. The neighboring blocks may be, respectively, reconstructed based on one of the neighboring block vectors in IntraTMP mode or IBC mode. In some implementations, the sizes of the neighboring blocks may be different from, or equal to, each other. Thus, the sizes of the IntraTMP search regions of the neighboring blocks may be different from, or equal to, each other.

In some implementations, the neighboring blocks may be, respectively, reconstructed based on one of the neighboring block vectors in IBC mode. As shown in FIG. 9A, when the block vector candidates of the block unit are derived based on the neighboring block vectors of the neighboring blocks, the neighboring block vectors of the neighboring blocks may be first mapped to the neighboring IBC vectors 961 and 962 of the block unit 900. Thus, the neighboring block vectors of the neighboring blocks may be, respectively, identical to a corresponding one of the neighboring IBC vectors 961 and 962 of the block unit 900. In addition, the IBC search regions of the neighboring blocks may also be mapped to an IBC reference region 960 of the block unit 900. The sizes of the IBC search regions may be determined based on the locations of the block unit 900 and the neighboring blocks, and may be unrelated to the sizes of the block unit 900 and the neighboring blocks. Thus, the sizes of the IBC search regions of the neighboring blocks may be identical to, or similar to, each other, since the neighboring blocks may neighbor each other.

Furthermore, each of the neighboring block vectors of the neighboring blocks may be, respectively, within a corresponding one of the IBC search regions of the neighboring blocks. Thus, the neighboring IBC vectors 961 and 962 of the block unit 900 may also be within the IBC reference region 960 of the block unit 900. However, as shown in FIG. 9A, the neighboring IBC vectors 961 and 962 of the block unit 900 may exceed the IntraTMP search region 950 of the block unit 900. Thus, the decoder module 124 may determine the neighboring IBC vectors 961 and 962 of the block unit 900 as the reference block vectors. The neighboring blocks corresponding to the neighboring IBC vectors 961 and 962 of the block unit 900 may be determined as the reference blocks.

In some other implementations, the neighboring blocks may be, respectively, reconstructed based on one of the neighboring block vectors in IntraTMP mode. As shown in FIG. 9B, when the block vector candidates of the block unit 900 are derived based on the neighboring block vectors of the neighboring blocks, the neighboring block vectors of the neighboring blocks may be first mapped to the neighboring IntraTMP vectors 973 and 974 of the block unit 900. Thus, the neighboring block vectors of the neighboring blocks may be, respectively, identical to a corresponding one of the neighboring IntraTMP vectors 973 and 974 of the block unit 900. In some implementations, as shown in FIG. 9B, the IntraTMP search regions of the neighboring blocks may also be mapped to an IntraTMP reference region 970 of the block unit 900, when the sizes of the neighboring blocks are identical to each other. In other words, each of the sizes of the IntraTMP search regions may be identical to the size of IntraTMP reference region 970. In some other implementations, the IntraTMP search regions of the neighboring blocks may also be mapped to different IntraTMP reference regions of the block unit 900, when the sizes of the neighboring blocks are different from each other.

Furthermore, each of the neighboring block vectors of the neighboring blocks may be, respectively, within a corresponding one of the IntraTMP search regions of the neighboring blocks. Thus, the neighboring IntraTMP vectors 973 and 974 of the block unit 900 may also be within the IntraTMP reference region 970 of the block unit 900. However, as shown in FIG. 9B, the neighboring IntraTMP vectors 973 and 974 of the block unit 900 may exceed the IntraTMP search region 950 of a block unit 900. Thus, the decoder module 124 may determine the neighboring IntraTMP vectors 973 and 974 of the block unit 900 as the reference block vectors. Thus, the neighboring blocks corresponding to the neighboring IntraTMP vectors 973 and 974 of the block unit 900 may be determined as the reference blocks.

Referring back to FIG. 6, at block 640, the decoder module 124 may adjust the reference block vector to generate a block vector candidate of the block unit.

When the reference block vector exceeds the vector search region of the block unit, the reference block vector of the block unit may not be allowed to predict the block unit. In other words, the reference block vector of the block unit may not directly set as one of the block vector candidates. Thus, with reference to FIGS. 1 and 2, the decoder module 124 may adjust the reference block vector to generate one of the block vector candidates of the block unit.

In some implementations, the decoder module 124 may adjust the reference block vector to generate one of the block vector candidates of the block unit by clipping the reference block vector. For example, the reference block vector may be clipped to the boundary values.

In some implementations, when the number of boundary values along a direction is equal to two, the boundary values for the direction may be used to separate the vector components along the direction into three component groups. The three component groups may include a value increase group, a value unadjusted group, and a value decrease group.

For example, the boundary values along the horizontal direction may include a horizontal maximum and a horizontal minimum. When the horizontal component of the reference block vector is greater than the horizontal maximum, the horizontal component of the reference block vector may be included in the value decrease group. Thus, the horizontal component of the reference block vector may be clipped to the horizontal maximum as a horizontal component of the corresponding block vector candidate. In addition, when the horizontal component of the reference block vector is less than the horizontal minimum, the horizontal component of the reference block vector may be included in the value increase group. Thus, the horizontal component of the reference block vector may be clipped to the horizontal minimum, as the horizontal component of the corresponding block vector candidate. Furthermore, when the horizontal component of the reference block vector is less than, or equal to, the horizontal maximum and greater than, or equal to, the horizontal minimum, the horizontal component of the reference block vector may be included in the value unadjusted group, and may remain unchanged.

Thus, when the number of boundary values along a direction D is equal to two, a component $D_c$ of the block vector candidate along the direction D may be derived based on a component $D_r$ of the reference block vector along the direction D in the following functions:

$$D_c = \mathrm{Min}(D_{Max}, \mathrm{Max}(D_{min}, D_r))$$

where the values $D_{Max}$ and $D_{min}$ may be the two boundary values for the direction D.

In some other implementations, when the number of boundary values along the direction is equal to three, the boundary values for the direction may be used to separate the vector components along the direction into four component groups. In some implementations, the four component groups may include a first value increase group, a second value increase group, a value unadjusted group, and a value decrease group. In some other implementations, the four component groups may include a value increase group, a value unadjusted group, a first value decrease group, and a second value decrease group.

For example, the boundary values along the vertical direction may include a vertical maximum, a first vertical minimum, and a second vertical minimum. The second vertical minimum may be greater than the first vertical minimum. When the vertical component of the reference block vector is greater than the vertical maximum, the vertical component of the reference block vector may be included in the value decrease group. Thus, the vertical component of the reference block vector may be clipped to the vertical maximum as a vertical component of the corresponding block vector candidate. In addition, when the vertical component of the reference block vector is less than, or equal to, the vertical maximum and greater than, or equal to, the second vertical minimum, the vertical component of the reference block vector may be included in the value unadjusted group, and may remain unchanged. Furthermore, when the vertical component of the reference block vector is less than the second vertical minimum and greater than the first vertical minimum, the vertical component of the reference block vector may be included in the second value increase group. Thus, the vertical component of the reference block vector may be clipped to the second vertical minimum as the vertical component of the corresponding block vector candidate. Then, when the vertical component of the reference block vector is less than, or equal to, the first vertical minimum, the vertical component of the reference block vector may be included in the first value increase group. Thus, the vertical component of the reference block vector may be clipped to the first vertical minimum as the vertical component of the corresponding block vector candidate.

Thus, when the number of boundary values along the direction D is equal to three, a component $D_c$ of the block vector candidate along the direction D may be derived based on a component $D_r$ of the reference block vector along the direction D in the following functions:

$$\begin{cases} D_C = \text{Min}(D_{Max}, \text{Max}(D_{min2}, D_r)); & D_r > D_{min1} \\ D_C = D_{min1}; & D_r < D_{min1} \end{cases}$$

$$\begin{cases} D_C = \text{Min}(D_{Max2}, \text{Max}(D_{min}, D_r)); & D_r < D_{Max1} \\ D_C = D_{Max1}; & D_r > D_{Max1} \end{cases}$$

where the values $D_{Max}$, $D_{min1}$, and $D_{min2}$ may be a first set of the three boundary values, and the values $D_{Max1}$, $D_{Max2}$, and $D_{min}$ may be a second set of the three boundary values. In some implementations, when the middle of the three boundary values is less than zero, the three boundary values may be included in the first set having the value $D_{min2}$. In some other implementations, when the middle of the three boundary values is greater than zero, the three boundary values may be included in the second set having the value $D_{Max2}$.

With reference to FIGS. 7A and 8, since the vertical components of the neighboring IntraTMP vectors 841 and 842, being a negative value, are less than the first IBC vertical minimum $VC_{m1}$, the vertical components of two block vector candidates 831 and 832, corresponding to the neighboring IntraTMP vectors 841 and 842, may be equal to the first IBC vertical minimum $VC_{m1}$. In addition, since the horizontal component of the neighboring IntraTMP vector 841, being a positive value, is less than the IBC horizontal maximum $HC_M$ and greater than the second IBC horizontal minimum $HC_{m2}$, the horizontal component of the block vector candidate 831, corresponding to the neighboring IntraTMP vector 841, may remain unchanged and be equal to the horizontal component of the neighboring IntraTMP vector 841. However, since the horizontal component of the neighboring IntraTMP vector 842, being a negative value, is less than the second IBC horizontal minimum $HC_{m2}$ and greater than the first IBC horizontal minimum $HC_{m1}$, the horizontal component of the block vector candidate 832, corresponding to the neighboring IntraTMP vector 842, may be equal to the second IBC horizontal minimum $HC_{m2}$.

Furthermore, since the horizontal component of the neighboring IntraTMP vector 843, being a negative value, is less than the second IBC horizontal minimum $HC_{m2}$ and greater than the first IBC horizontal minimum $HC_{m1}$, the horizontal component of a block vector candidate 833, corresponding to the neighboring IntraTMP vector 843, may be equal to the second IBC horizontal minimum $HC_{m2}$. In addition, since the vertical component of the neighboring IntraTMP vector 843, being a negative value, is less than the second IBC vertical minimum $VC_{m2}$ and greater than the first IBC vertical minimum $VC_{m1}$, the vertical component of the block vector candidate 833, corresponding to the neighboring IntraTMP vector 843, may be equal to the second IBC vertical minimum $VC_{m2}$.

With reference to FIGS. 7B and 9A, since the vertical component of the neighboring IBC vector 961, being a negative value, is less than the IntraTMP vertical minimum $VP_m$, the vertical components of a block vector candidate 951, corresponding to the neighboring IBC vector 961, may be equal to the IntraTMP vertical minimum $VP_m$. In addition, since the horizontal component of the neighboring IBC vector 961, being a negative value, is less than the IntraTMP horizontal minimum $HP_m$, the horizontal component of the block vector candidate 951, corresponding to the neighboring IBC vector 961, may be equal to the IntraTMP horizontal minimum $HP_m$.

With reference to FIGS. 7B and 9B, since the vertical component of the neighboring IntraTMP vector 973, being a negative value, is less than the IntraTMP vertical minimum $VP_m$, the vertical components of the block vector candidate 951, corresponding to the neighboring IntraTMP vector 973, may be equal to the IntraTMP vertical minimum $VP_m$. In addition, since the horizontal component of the neighboring IntraTMP vector 973, being a negative value, is less than the IntraTMP horizontal minimum $HP_m$, the horizontal component of the block vector candidate 951, corresponding to the neighboring IntraTMP vector 973, may be equal to the IntraTMP horizontal minimum $HP_m$.

In some other implementations, the decoder module 124 may adjust the reference block vector to generate one of the block vector candidates of the block unit by scaling the reference block vector. For example, each of the vertical and horizontal components of the reference block vector may be proportionally shortened to be within the vector search region.

With reference to FIGS. 7A and 8, the vertical component of the neighboring IntraTMP vector 844, being a positive value, may be greater than the IBC vertical maximum $VC_M$, and the horizontal component of the neighboring IntraTMP vector 844, being a negative value, may be less than the second IBC horizontal minimum $HC_{m2}$ and greater than the first IBC horizontal minimum $HC_{m1}$. Thus, each of vertical and horizontal components $VN_{844}$ and $HN_{844}$ of the neighboring IntraTMP vector 844 may be proportionally decreased to generate a block vector candidate 834 of the block unit 800 within the IBC search region 830. A vertical component $VB_{834}$ of the block vector candidate 834 of the block unit 800 may be equal to the IBC vertical maximum $VC_M$, and a horizontal component $HB_{834}$ of the block vector candidate 834 of the block unit 800 may be greater than the second IBC horizontal minimum $HC_{m2}$. In addition, the horizontal component $HB_{834}$ of the block vector candidate 834 of the block unit 800 may be equal to $HN_{844} \times (VC_M / VN_{844})$.

With reference to FIGS. 7B and 9A, the horizontal component of the neighboring IBC vector 962, being a positive value, may be greater than the IntraTMP horizontal maximum $HP_M$, and the vertical component of the neighboring IBC vector 962, being a negative value, may be less than the IntraTMP vertical maximum $VP_M$ and greater than the IntraTMP vertical minimum $VP_m$. Thus, each of vertical and horizontal components $VN_{962}$ and $HN_{962}$ of the neighboring IBC vector 962 may be proportionally decreased to generate a block vector candidate 952 of the block unit 900 within the IntraTMP search region 950. A horizontal component $HB_{952}$ of the block vector candidate 952 of the block unit 900 may be equal to the IntraTMP horizontal maximum $HP_M$, and a vertical component $VB_{952}$ of the block vector candidate 952 of the block unit 900 may still be less than the IntraTMP vertical maximum $VP_M$ and greater than the IntraTMP vertical minimum $VP_m$. In addition, the vertical component $VB_{952}$ of the block vector candidate 952 of the block unit 900 may be equal to $VN_{962} \times (HP_M/HN_{962})$.

With reference to FIGS. 7B and 9B, the horizontal component of the neighboring IntraTMP vector 974, being a negative value, may be less than the IntraTMP horizontal minimum $HP_m$, and the vertical component of the neighboring IntraTMP vector 974 may also be less than the IntraTMP vertical minimum $VP_m$. Thus, each of vertical and horizontal components $VN_{974}$ and $HN_{974}$ of the neighboring IntraTMP vector 974 may be proportionally decreased to generate a block vector candidate 954 of the block unit 900 within the IntraTMP search region 950. A horizontal component $HB_{954}$ of the block vector candidate 954 of the block unit 900 may be equal to the IntraTMP horizontal minimum $HP_m$, and a vertical component $VB_{954}$ of the block vector candidate 954 of the block unit 900 may be less than the IntraTMP vertical maximum $VP_M$ and greater than the IntraTMP vertical minimum $VP_m$. In addition, the vertical component $VB_{954}$ of the block vector candidate 954 of the block unit 900 may be equal to $VN_{974} \times (HP_m/HN_{974})$.

In yet some other implementations, the decoder module 124 may directly ignore the reference block vector when the reference block vector exceeds the vector search region of the block unit. Thus, there may be no block vector candidate, that is derived based on the reference block vector, and that exceeds the vector search region of the block unit.

Referring back to FIG. 6, at block 650, the decoder module 124 may reconstruct the block unit based on the block vector candidate of the block unit.

With reference to FIGS. 1 and 2, the decoder module 124 may select one of the block vector candidates from the vector candidate list. In some implementations, the decoder module 124 may determine the selected block vector candidate of the block unit from the IBC candidate list. For example, the decoder module 124 may determine an IBC index of the block unit from the bitstream for determining the selected block vector candidate of the block unit from the IBC candidate list.

The IBC mode may include IBC merge mode and IBC advanced motion vector prediction (AMVP) mode. In some implementations, when the block unit is reconstructed in IBC merge mode, the decoder module 124 may directly determine the selected block vector candidate of the block unit as a predicted block vector of the block unit. In some other implementations, when the block unit is reconstructed in IBC AMVP mode, the decoder module 124 may determine a block vector difference of the block unit from the bitstream, and may add the block vector difference into the selected block vector candidate of the block unit to generate the predicted block vector of the block unit. Then, the decoder module 124 may determine a predicted block of the block unit, indicated by the predicted block vector of the block unit.

In some other implementations, the decoder module 124 may determine the selected block vector candidate of the block unit from the IntraTMP candidate list. For example, the decoder module 124 may calculate a template cost value for each of the block vector candidates of the block unit in the IntraTMP candidate list, and may determine the selected block vector candidate of the block unit from the IntraTMP candidate list based on the template cost values. Then, the decoder module 124 may directly determine the selected block vector candidate of the block unit as the predicted block vector of the block unit, and may determine the predicted block of the block unit, indicated by the predicted block vector of the block unit.

In yet some other implementations, when the block unit is reconstructed in IBC mode including IBC merge mode and IBC AMVP mode, the decoder module 124 may determine the IBC index of the block unit from the bitstream for selecting one of the neighboring block vectors for the block unit. When the decoder module 124 determines that the selected neighboring block unit, indicated by the IBC index, may exceed the vector search region, at block 630, the decoder module 124 may determine the selected neighboring block vector as the reference block vector. Then, the decoder module 124 may adjust the reference block vector to generate the block vector candidate at block 640. Finally, the decoder module 124 may directly set the block vector candidate as the predicted block vector, and may determine the predicted block of the block unit, indicated by the predicted block vector of the block unit. In the implementations, the decoder module 124 may only determine whether the selected neighboring block vector, indicated by the IBC index, may exceed the vector search region or not. In other words, the decoder module 124 may bypass determining whether the unselected block vectors may exceed the vector search region or not.

The decoder module 124 may determine multiple residual components of a residual block from the bitstream for the block unit and add the residual components into the predicted block to reconstruct the block unit. The decoder module 124 may reconstruct all of the other block units in the image frame for reconstructing the image frame and the video. The method/process 600 may then end.

Figure 10:
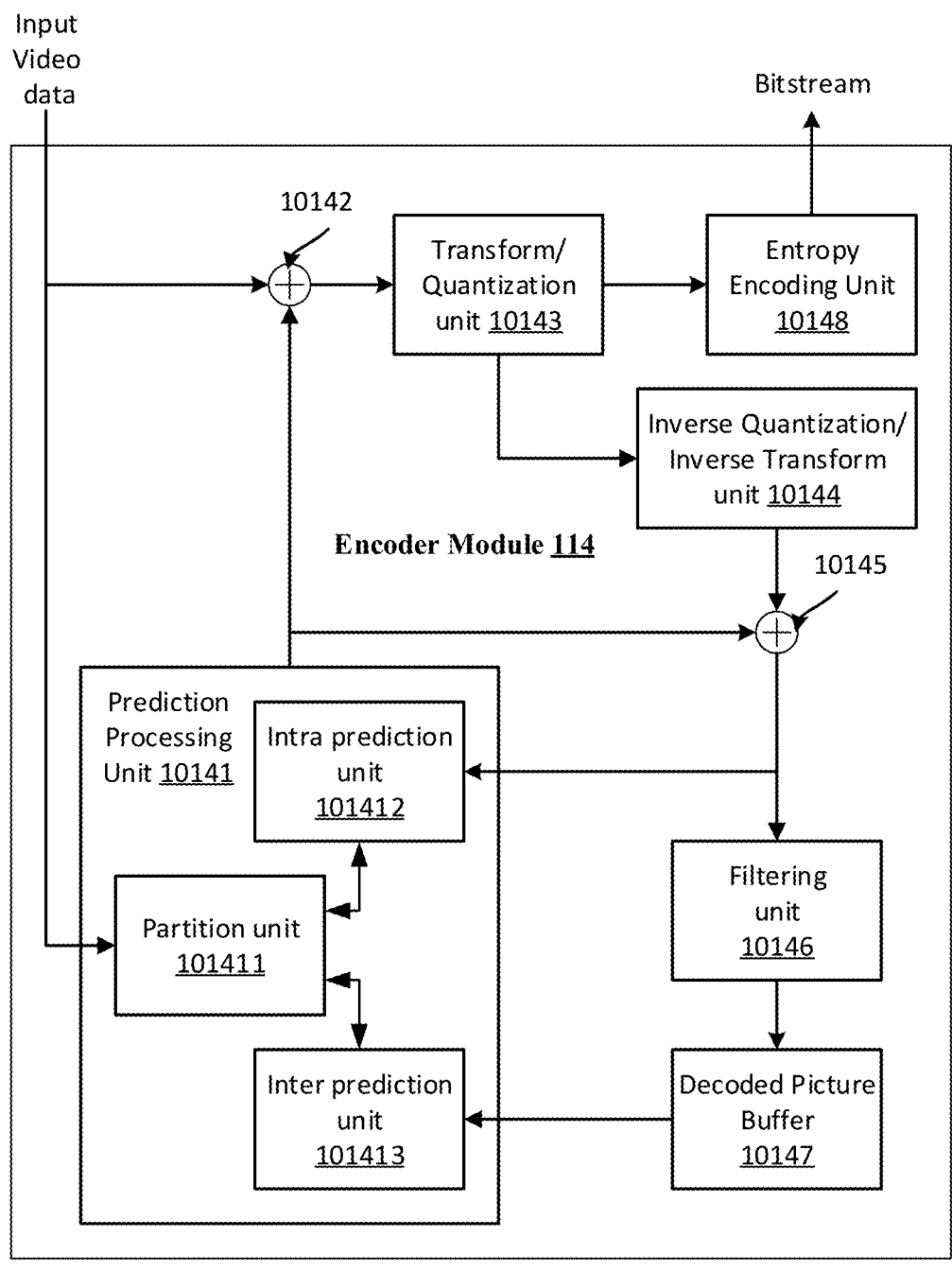
FIG. 10 is a block diagram illustrating an encoder module of the first electronic device illustrated in FIG. 1, in accordance with one or more example implementations of this disclosure.

FIG. 10 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 10141), at least a first summer (e.g., a first summer 10142) and a second summer (e.g., a second summer 10145), a transform/quantization processor (e.g., a transform/quantization unit 10143), an inverse quantization/inverse transform processor (e.g., an inverse quantization/inverse transform unit 10144), a filter (e.g., a filtering unit 10146), a decoded picture buffer (e.g., a decoded picture buffer 10147), and an entropy encoder (e.g., an entropy encoding unit 10148). The prediction processing unit 10141 of the encoder module 114 may further include a partition processor (e.g., a partition unit 101411), an intra prediction processor (e.g., an intra prediction unit 101412), and an inter prediction processor (e.g., an inter prediction unit 101413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional subdivisions of the source video. It should be noted that the disclosed implementations are generally applicable to video coding regardless of how the source video is partitioned prior to and/or during the encoding.

During the encoding process, the prediction processing unit 10141 may receive a current image block of a specific one of the image frames. The current image block may be the luminance block or one of the chrominance blocks in the specific image frame.

The partition unit 101411 may divide the current image block into multiple block units. The intra prediction unit 101412 may perform intra-predictive coding of a current block unit relative to one or more neighboring blocks in the same frame, as the current block unit, in order to provide spatial prediction. The inter prediction unit 101413 may perform inter-predictive coding of the current block unit relative to one or more blocks in one or more reference image blocks to provide temporal prediction.

The prediction processing unit 10141 may select one of the coding results generated by the intra prediction unit 101412 and the inter prediction unit 101413 based on a mode selection method, such as a cost function. The mode selection method may be a rate-distortion optimization (RDO) process.

The prediction processing unit 10141 may determine the selected coding result and provide a predicted block corresponding to the selected coding result to the first summer 10142 for generating a residual block and to the second summer 10145 for reconstructing the encoded block unit. The prediction processing unit 10141 may further provide syntax elements, such as motion vectors, intra-mode indicators, partition information, and/or other syntax information, to the entropy encoding unit 10148.

The intra prediction unit 101412 may intra-predict the current block unit. The intra prediction unit 101412 may determine an intra prediction mode directed toward a reconstructed sample neighboring the current block unit in order to encode the current block unit.

The intra prediction unit 101412 may encode the current block unit using various intra prediction modes. The intra prediction unit 101412 of the prediction processing unit 10141 may select an appropriate intra prediction mode from the selected modes. The intra prediction unit 101412 may encode the current block unit using a cross-component prediction mode to predict one of the two chroma components of the current block unit based on the luma components of the current block unit. The intra prediction unit 101412 may predict a first one of the two chroma components of the current block unit based on the second of the two chroma components of the current block unit.

The inter prediction unit 101413 may inter-predict the current block unit as an alternative to the intra prediction performed by the intra prediction unit 101412. The inter prediction unit 101413 may perform motion estimation to estimate motion of the current block unit for generating a motion vector.

The motion vector may indicate a displacement of the current block unit within the current image block relative to a reference block unit within a reference image block. The inter prediction unit 101413 may receive at least one reference image block stored in the decoded picture buffer 10147 and estimate the motion based on the received reference image blocks to generate the motion vector.

The first summer 10142 may generate the residual block by subtracting the prediction block determined by the prediction processing unit 10141 from the original current block unit. The first summer 10142 may represent the component or components that perform this subtraction.

The transform/quantization unit 10143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 10143 may perform a scan of the matrix including the quantized transform coefficients. Alternatively, the entropy encoding unit 10148 may perform the scan.

The entropy encoding unit 10148 may receive multiple syntax elements from the prediction processing unit 10141 and the transform/quantization unit 10143, including a quantization parameter, transform data, motion vectors, intra modes, partition information, and/or other syntax information. The entropy encoding unit 10148 may encode the syntax elements into the bitstream.

The entropy encoding unit 10148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 10144 may apply inverse quantization and inverse transformation to reconstruct the residual block in the pixel domain for later use as a reference block. The second summer 10145 may add the reconstructed residual block to the prediction block provided by the prediction processing unit 10141 in order to produce a reconstructed block for storage in the decoded picture buffer 10147.

The filtering unit 10146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 10145.

The decoded picture buffer 10147 may be a reference picture memory that stores the reference block to be used by the encoder module 1014 to encode video, such as in intra-coding or inter-coding modes. The decoded picture buffer 10147 may include a variety of memory devices, such as DRAM (e.g., including SDRAM), MRAM, RRAM, or other types of memory devices. The decoded picture buffer 10147 may be on-chip with other components of the encoder module 114 or off-chip relative to those components.

The method/process 300 for decoding and/or encoding video data may be performed by the first electronic device 110. With reference to FIGS. 1 and 10, at block 310, the method/process 300 may start by the encoder module 114 receiving the video data. The video data received by the encoder module 114 may be a video.

At block 320, the encoder module 114 may determine, from a current frame included in the video data, a chroma block unit and a luma reconstruction block, the luma reconstruction block being collocated with the chroma block unit and reconstructed in bi-predictive intra block copy (IBC) mode. With reference to FIGS. 1 and 10, the encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

The block unit may include a luma block unit and a chroma block unit. Since the luma block unit may be reconstructed based on the luma block vector prior to the reconstruction of the chroma block unit, the luma block vector may be determined for predicting and reconstructing the luma block unit of the block unit prior to the reconstruction of the chroma block unit. At least one luma block unit may be collocated with the chroma block unit. In some implementations, the number of the at least one luma block unit may be equal to one when the chroma block unit is included in a single-tree block unit, determined from the current frame. As shown in FIG. 4A, the size of the luma block unit 401 may be identical to the size of the block unit. The size of the chroma block unit 402 may be determined based on a scaling factor. The scaling factor may be determined based on a video format.

In some other implementations, the number of the at least one luma block unit may be equal to, or greater than, one when the chroma block unit is included in a dual-tree block unit, determined from the current frame. As shown in FIG. 4B, there may be ten luma block units in the luma co-located block 4010. In order to predict the chroma block unit 402, the encoder module 114 may determine a part of the prediction information of the luma block units for deriving multiple chroma prediction candidates. In some implementations, the encoder module 114 may determine multiple candidate positions, and select multiple luma coded blocks from the luma block units based on the candidate positions for deriving the chroma prediction candidates. It should be noted that the candidate positions in the luma co-located block 4010 may be changed without departing from the scope of the present disclosure. Each of the luma coded blocks may include at least one of multiple candidate samples. The candidate samples may be located, respectively, at one of the candidate positions.

The encoder module 114 may reconstruct the luma block units in the luma co-located block 4010 using multiple luma prediction schemes. The luma prediction schemes of the luma block units may be identical to, or different from, each other. The encoder module 114 may derive the chroma prediction candidates based on the prediction information of the luma coded blocks. When at least one of the luma coded blocks in the luma co-located block 4010 is reconstructed in the bi-predictive intra block copy (IBC) mode, the encoder module 114 may determine a luma reconstruction block from the at least one of the luma coded blocks. The prediction information of the luma reconstruction block may be used to derive at least one of the chroma prediction candidates by the encoder module 114. When the number of the at least one of the luma coded blocks, reconstructed in the bi-predictive IBC mode, is greater than one, the encoder module 114 may determine multiple luma reconstruction blocks from the luma coded blocks, reconstructed in the bi-predictive IBC mode. The prediction information of the luma reconstruction blocks may be used to derive the chroma prediction candidates by the encoder module 114.

Referring back to FIG. 3, at block 330, the encoder module 114 may derive at least one bi-predictive-IBC-based candidate of the chroma block unit based on two luma block vectors used to reconstruct the luma reconstruction block in the bi-predictive IBC mode.

With reference to FIGS. 1 and 10, the at least one bi-predictive-IBC-based candidate of the chroma block unit determined by the encoder module 114 may be identical to that determined by the decoder module 124. Furthermore, the encoder module 114 may also derive the chroma prediction candidates based on the prediction information of the luma coded blocks to generate the chroma candidate list. The chroma prediction candidates in the chroma candidate list may include one or more of multiple uni-predictive-based candidates or multiple bi-predictive-based candidates. The chroma candidate list of the chroma block unit determined by the encoder module 114 may be identical to that determined by the decoder module 124.

In some implementations, a specific one of the at least one bi-predictive-IBC-based candidate may include a chroma block vector derived based on a specific one of the two luma block vectors corresponding to the specific bi-predictive-IBC-based candidate, when the specific bi-predictive-IBC-based candidate is derived in direct block vector (DBV) mode. In some other implementations, a specific one of the at least one bi-predictive-IBC-based candidate may include a chroma intra prediction mode, derived based on a mode reference block indicated by a specific one of the two luma block vectors corresponding to the specific bi-predictive-IBC-based candidate, when the specific bi-predictive-IBC-based candidate is derived in chroma direct mode (DM). In yet some other implementations, a specific one of the at least one bi-predictive-IBC-based candidate may include a chroma prediction model derived based on a model reference block indicated by a specific one of the two luma block vectors corresponding to the specific bi-predictive-IBC-based candidate, when the specific bi-predictive-IBC-based candidate is derived in block-vector-guided convolutional cross-component model (BVG-CCCM) mode.

Referring back to FIG. 3, at block 340, the encoder module 114 may reconstruct the chroma block unit based on the at least one bi-predictive-IBC-based candidate. With reference to FIGS. 1 and 10, the encoder module 114 may reconstruct the chroma block unit based on the chroma prediction candidates in the chroma candidate list. The chroma prediction candidates may include the one or more of the uni-predictive-based candidates or the bi-predictive-based candidates in the chroma candidate list. The bi-predictive-based candidates may include the at least one bi-predictive-IBC-based candidate.

In some implementations, the encoder module 114 may determine an arrangement of the chroma prediction candidates based on multiple template cost values, and select all or a portion of the chroma prediction candidates based on the determined arrangement of the chroma prediction candidates to generate a chroma reordered list. Then, the encoder module 114 may predict the chroma block unit using each of the chroma prediction candidates in the chroma reordered list to generate multiple chroma prediction blocks. The template cost values of the chroma prediction candidates, determined by the encoder module 114, may be identical to those, determined by the decoder module 124. The arrangement of the chroma prediction candidates determined by the encoder module 114 may be identical to that, determined by the decoder module 124. In addition, the chroma reordered list, determined by the encoder module 114, may be identical to that, determined by the decoder module 124.

In some other implementations, the encoder module 114 may directly predict the chroma block unit using each of the chroma prediction candidates in the chroma candidate list to generate the chroma prediction blocks. In other words, the encoder module 114 may predict the block unit using each of the chroma prediction candidates at the following block of the method/process 300, without calculating the template cost values and generating the chroma reordered list.

In yet some other implementations, when the encoder module 114 selects two chroma prediction modes from the chroma prediction candidates in the chroma candidate list to add multiple chrome weighting candidates into the chroma candidate list. Then, the encoder module 114 may predict the chroma block unit using each of the chrome weighting candidates in the chroma candidate list based on two weighting parameters to generate one of the chroma prediction blocks. The two weighting parameters, determined by the encoder module 114, may be identical to those, determined by the decoder module 124.

In some implementations, the encoder module 114 may predict the chroma block unit based on each of the chroma prediction candidates to generate the chroma predicted blocks. In addition, the encoder module 114 may predict the chroma block unit based on other prediction modes to generate multiple chroma prediction blocks. The encoder module 114 may select one of the chroma predicted blocks and the chroma prediction blocks based on a mode selection method, such as a cost function. The mode selection method may be an RDO process, a Sum of Absolute Difference (SAD) process, a Sum of Absolute Transformed Difference (SATD) process, a Mean Absolute Difference (MAD) process, a Mean Squared Difference (MSD) process, and a Structural SIMilarity (SSIM) process. The encoder module 114 may provide the selected coding result to the first summer 8142 for generating a residual block and to the second summer 8145 for reconstructing the encoded block unit.

In some implementations, when one of the chroma predicted blocks corresponding to one of the chroma prediction candidates is selected to predict and reconstruct the chroma block unit, the encoder module 114 may further provide syntax elements, such as a chroma prediction index, included in the bitstream for transmitting to the decoder module 124. The chroma prediction index of the chroma block unit may be used to determine the selected one of the chroma prediction candidates.

In some implementations, when the selected one of the chroma prediction candidates corresponds to a first chroma prediction candidate in the chroma reordered list, the chroma prediction index may be excluded from the bitstream. Thus, the decoder module 124 may directly determine the first chroma prediction candidate in the chroma reordered list as the chroma prediction mode without receiving the chroma prediction index from the bitstream.

In some other implementations, when the selected one of the chroma prediction candidates corresponds to a predefined one of the chroma prediction candidates, the chroma prediction index may be excluded from the bitstream. Thus, the decoder module 124 may directly determine the predefine chroma prediction candidate as the chroma prediction mode without receiving the chroma prediction index from the bitstream.

In yet some other implementations, when the selected one of the chroma prediction candidates corresponds to one of the chrome weighting candidates, the number of the chroma prediction indices may be equal to two for selecting two of the chroma prediction candidates. In addition, when the encoder module 124 directly selects the first two chroma prediction candidates from the chroma reordered list, the decoder module 124 may also directly determine the first two chroma prediction candidates from the chroma reordered list without receiving the chroma prediction index from the bitstream.

The reconstruction of the block unit by the encoder module 114 may be identical to the reconstruction of the block unit by the decoder module 124. The method/process 300 for the encoder module 114 may then end.

The method/process 600 for decoding and/or encoding video data may be performed by the first electronic device 110. With reference to FIGS. 1 and 10, at block 610, the method/process 600 may start by the encoder module 114 receiving the video data. The video data received by the encoder module 114 may be a video. At block 620, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 630, the encoder module 114 may determine a reference block vector of a reference block, the reference block vector exceeding a vector search region of the block unit.

With reference to FIGS. 1 and 10, the encoder module 114 may determine a vector candidate list for predicting the block unit. The vector candidate list may be derived based on multiple neighboring block vectors of multiple neighboring blocks neighboring the block unit. The neighboring blocks may be reconstructed prior to the reconstruction of the block unit. The neighboring blocks determined by the encoder module 114 may be identical to those determined by the decoder module 124. In addition, the neighboring block vectors of the neighboring blocks determined by the encoder module 114 may be identical to those determined by the decoder module 124.

The encoder module 114 may also determine the vector search region for checking the neighboring block vectors. The vector search region determined by the encoder module 114 may be identical to that determined by the decoder module 124. When the encoder module 114 determines that the neighboring block vectors exceeds the vector search region determined by the encoder module 114, the decoder module 124 may also determine that the neighboring block vectors exceeds the vector search region determined by the decoder module 124. Thus, the reference block vectors determined by the encoder module 114 may be identical to those determined by the decoder module 124.

At block 640, the encoder module 114 may adjust the reference block vector to generate a block vector candidate of the block unit. When the reference block vector exceeds the vector search region of the block unit, the reference block vector of the block unit may not be allowed to predict the block unit. In other words, the reference block vector of the block unit may not directly set as one of the block vector candidates.

The vector candidate list may include at least one of an IntraTMP candidate list and an IBC candidate list. The IntraTMP candidate list may include multiple IntraTMP vector candidates including the block vector candidates generated by adjusting the reference block vectors. In addition, the IBC candidate list may include multiple IBC vector candidates including the block vector candidates generated by adjusting the reference block vectors. Furthermore, the IntraTMP vector candidates may be derived based on the neighboring block vectors used to reconstruct the neighboring blocks in IntraTMP mode, and may be derived based on the neighboring block vectors used to reconstruct the neighboring blocks in IBC mode. The IBC vector candidates may be derived based on the neighboring block vectors used to reconstruct the neighboring blocks in IBC mode, and may be derived based on the neighboring block vectors used to reconstruct the neighboring blocks in IntraTMP mode.

With reference to FIGS. 1 and 10, in some implementations, the encoder module 114 may adjust the reference block vector to generate one of the block vector candidates of the block unit by clipping the reference block vector. The clipping scheme performed by the encoder module 114 may be identical to that performed by the decoder module 124. In some other implementations, the encoder module 114 may adjust the reference block vector to generate one of the block vector candidates of the block unit by scaling the reference block vector. The scaling scheme performed by the encoder module 114 may be identical to that performed by the decoder module 124.

In yet some other implementations, the encoder module 114 may directly ignore the reference block vector when the reference block vector exceeds the vector search region of the block unit. Thus, there may be no block vector candidate, that is derived based on the reference block vector, exceeds the vector search region of the block unit.

At block 650, the encoder module 124 may reconstruct the block unit based on the block vector candidate of the block unit.

In some implementations, the encoder module 124 may predict the block unit in IBC mode. The IBC mode may include IBC merge mode and IBC advanced motion vector prediction (AMVP) mode. The encoder module 124 may determine, from the current frame, a predicted block for each of the IBC vector candidates in the IBC candidate list for predicting the block unit in IBC merge mode. In addition, the encoder module 124 may combine multiple block vector differences with the IBC vector candidates in the IBC candidate list to generate multiple IBC AMVP vector candidates. Then, the encoder module 124 may determine, from the current frame, a predicted block for each of the IBC AMVP vector candidates for predicting the block unit in IBC AMVP mode. The block vector difference may be predefined in a vector difference list in the encoder module 124.

In some other implementations, the encoder module 124 may calculate a template cost value for each of the IntraTMP vector candidates of the block unit in the IntraTMP candidate list, and may select one of the IntraTMP vector candidates from the IntraTMP candidate list for the block unit based on the template cost values. Then, the decoder module 124 may determine the predicted block of the block unit, indicated by the selected IntraTMP vector candidate of the block unit.

Furthermore, the encoder module 114 may predict the block unit based on other prediction modes to generate multiple prediction blocks. The encoder module 114 may select one of the at least one predicted block and the prediction blocks based on a mode selection method, such as a cost function. The mode selection method may be an RDO process, a Sum of Absolute Difference (SAD) process, a Sum of Absolute Transformed Difference (SATD) process, a Mean Absolute Difference (MAD) process, a Mean Squared Difference (MSD) process, and a Structural SIMilarity (SSIM) process. The encoder module 114 may provide the selected coding result to the first summer 8142 for generating a residual block and to the second summer 8145 for reconstructing the encoded block unit.

In some implementations, when one of the predicted blocks, corresponding to one of the IBC vector candidates, is selected to predict and reconstruct the block unit, the encoder module 114 may further provide syntax elements, such as an IBC index, an IBC merge flag, an IBC AMVP flag, a difference index, included in the bitstream for transmitting to the decoder module 124. The IBC index of the block unit may be used to determine the selected IBC vector candidate for predicting the block unit. The IBC merge flag may be used to indicate that the block unit is reconstructed in IBC merge mode. The IBC AMVP flag may be used to indicate that the block unit is reconstructed in IBC AMVP mode. The difference index may be used to indicate a selected one of the block vector differences to combine with the selected IBC vector candidate in IBC AMVP mode In some other implementations, when one of the predicted blocks, corresponding to one of the IntraTMP vector candidates, is selected to predict and reconstruct the block unit, the encoder module 114 may further provide syntax elements, such as an IntraTMP flag, included in the bitstream for transmitting to the decoder module 124. The IntraTMP flag may be used to indicate that the block unit is reconstructed in IntraTMP mode.

The method/process 600 for the encoder module 114 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:
   receiving the video data;
   determining, from a current frame that is included in the video data, a chroma block unit and a luma reconstruction block, the luma reconstruction block being collocated with the chroma block unit and reconstructed in a bi-predictive intra block copy (IBC) mode;
   deriving at least one bi-predictive-IBC-based candidate of the chroma block unit based on two luma block vectors, the two luma block vectors used to reconstruct the luma reconstruction block in the bi-predictive IBC mode, wherein:
      a specific one of the at least one bi-predictive-IBC-based candidate includes a chroma prediction model that is derived based on a model reference block when the specific one of the at least one bi-predictive-IBC-based candidate is derived in a block-vector-guided convolutional cross-component model (BVG-CCCM) mode, and
      the model reference block is indicated by a specific one of the two luma block vectors that corresponds to the specific one of the at least one bi-predictive-IBC-based candidate; and
   reconstructing the chroma block unit based on the at least one bi-predictive-IBC-based candidate.

2. The method according to claim 1, wherein:
   the specific one of the at least one bi-predictive-IBC-based candidate includes a chroma block vector that is proportional to the specific one of the two luma block vectors, and
   the one of the at least one bi-predictive-IBC-based candidate is derived based on the one of the two luma block vectors.

3. The method according to claim 1, further comprising:
   determining a chroma candidate list that includes one or more of a plurality of uni-predictive-based candidates or a plurality of bi-predictive-based candidates, wherein:

each of the at least one bi-predictive-IBC-based candidate is included in the plurality of bi-predictive-based candidates, and reconstructing the chroma block unit is further based on the one or more of the plurality of uni-predictive-based candidates or the plurality of bi-predictive-based candidates in the chroma candidate list.

4. The method according to claim 3, further comprising:
determining, from the video data, a chroma prediction index that indicates one of the one or more of the plurality of uni-predictive-based candidates or the plurality of bi-predictive-based candidates, wherein:

reconstructing the chroma block unit is further based on the indicated one of the one or more of the plurality of uni-predictive-based candidates or the plurality of bi-predictive-based candidates.

5. The method according to claim 3, further comprising:
determining, from the current frame, a chroma template region that neighbors the chroma block unit;

predicting the chroma template region using the one or more of the plurality of uni-predictive-based candidates or the plurality of bi-predictive-based candidates to generate one or more chroma template predictions; and determining one or more template cost values, each of the one or more template cost values comprising a template cost value between a chroma template reconstruction of the chroma template region and a corresponding one of the one or more chroma template predictions.

6. The method according to claim 5, further comprising:
selecting one of the one or more of the plurality of uni-predictive-based candidates or the plurality of bi-predictive-based candidates based on the one or more template cost values, wherein reconstructing the chroma block unit is further based on the selected one of the one or more of the plurality of uni-predictive-based candidates or the plurality of bi-predictive-based candidates.

7. The method according to claim 5, further comprising:
selecting two chroma prediction modes from the one or more of the plurality of uni-predictive-based candidates or the plurality of bi-predictive-based candidates;

predicting the chroma block unit based on the two chroma prediction modes to generate two chroma prediction blocks;

deriving two weighting parameters based on the one or more template cost values of the two chroma prediction modes; and weightedly combining the two chroma prediction blocks based on the two derived weighting parameters to generate a weighted block, wherein reconstructing the chroma block unit is further based on the weighted block.

8. The method according to claim 1, wherein:
the specific one of the at least one bi-predictive-IBC-based candidate includes a chroma block vector that is derived based on the specific one of the two luma block vectors, that corresponds to the specific one of the at least one bi-predictive-IBC-based candidate when the specific one of the at least one bi-predictive-IBC-based candidate is derived in a direct block vector (DBV) mode.

9. The method according to claim 1, wherein:
the specific one of the at least one bi-predictive-IBC-based candidate includes a chroma intra prediction mode that is derived based on a mode reference block when the specific one of the at least one bi-predictive-IBC-based candidate is derived in a chroma direct mode (DM), and the mode reference block is indicated by the specific one of the two luma block vectors that corresponds to the specific one of the at least one bi-predictive-IBC-based candidate.

10. The method according to claim 1, wherein:
at least one luma block unit, including the luma reconstruction block, is collocated with the chroma block unit, the number of the at least one luma block unit is equal to one when the chroma block unit is included in a single-tree block unit, determined from the current frame, and the number of the at least one luma block unit is equal to or greater than one when the chroma block unit is included in a dual-tree block unit, determined from the current frame.

11. An electronic device for decoding video data, the electronic device comprising:
at least one processor; and
at least one non-transitory computer-readable medium coupled to the at least one processor and storing one or more computer-executable instructions that, when executed by the at least one processor, cause the electronic device to:
receive the video data;
determine, from a current frame that is included in the video data, a chroma block unit and a luma reconstruction block, the luma reconstruction block being collocated with the chroma block unit and reconstructed in a bi-predictive intra block copy (IBC) mode;
derive at least one bi-predictive-IBC-based candidate of the chroma block unit based on two luma block vectors, the two luma block vectors used to reconstruct the luma reconstruction block in the bi-predictive IBC mode, wherein:
a specific one of the at least one bi-predictive-IBC-based candidate includes a chroma prediction model that is derived based on a model reference block when the specific one of the at least one bi-predictive-IBC-based candidate is derived in a block-vector-guided convolutional cross-component model BVG-CCCM) mode, and
the model reference block indicated by a specific one of the two luma block vectors that corresponds to the specific one of the at least one bi-predictive-IBC-based candidate; and
reconstruct the chroma block unit based on the at least one bi-predictive-IBC-based candidate.

12. The electronic device according to claim 11, wherein the one or more computer-executable instructions, when executed by the at least one processor, further cause the electronic device to:
determine a chroma candidate list that includes one or more of a plurality of uni-predictive-based candidates or a plurality of bi-predictive-based candidates, wherein:
each of the at least one bi-predictive-IBC-based candidate is included in the plurality of bi-predictive-based candidates, and
reconstructing the chroma block unit is further based on the one or more of the plurality of uni-predictive-based candidates or the plurality of bi-predictive-based candidates in the chroma candidate list.

13. The electronic device according to claim 12, wherein the one or more computer-executable instructions, when executed by the at least one processor, further cause the electronic device to:

determine, from the video data, a chroma prediction index that indicates one of the one or more of the plurality of uni-predictive-based candidates or the plurality of bi-predictive-based candidates, wherein:

reconstructing the chroma block unit is further based on the indicated one of the one or more of the plurality of uni-predictive-based candidates or the plurality of bi-predictive-based candidates.

14. The electronic device according to claim 12, wherein the one or more computer-executable instructions, when executed by the at least one processor, further cause the electronic device to:

determine, from the current frame, a chroma template region that neighbors the chroma block unit;

predict the chroma template region using the one or more of the plurality of uni-predictive-based candidates or the plurality of bi-predictive-based candidates to generate one or more chroma template predictions; and determine one or more template cost values, each of the one or more template cost values comprising a template cost value between a chroma template reconstruction of the chroma template region and a corresponding one of the one or more chroma template predictions.

15. The electronic device according to claim 14, wherein the one or more computer-executable instructions, when executed by the at least one processor, further cause the electronic device to:

select one of the one or more of the plurality of uni-predictive-based candidates or the plurality of bi-predictive-based candidates based on the one or more template cost values, wherein reconstructing the chroma block unit is further based on the selected one of the one or more of the plurality of uni-predictive-based candidates or the plurality of bi-predictive-based candidates.

16. The electronic device according to claim 14, wherein the one or more computer-executable instructions, when executed by the at least one processor, further cause the electronic device to:

select two chroma prediction modes from the one or more of the plurality of uni-predictive-based candidates or the plurality of bi-predictive-based candidates;

predict the chroma block unit based on the two chroma prediction modes to generate two chroma prediction blocks;

derive two weighting parameters based on the one or more template cost values of the two chroma prediction modes; and weightedly combine the two chroma prediction blocks based on the two derived weighting parameters to generate a weighted block, wherein reconstructing the chroma block unit is further based on the weighted block.

17. The electronic device according to claim 11, wherein:

the specific one of the at least one bi-predictive-IBC-based candidate includes a chroma block vector that is derived based on the specific one of the two luma block vectors, that corresponds to the specific one of the at least one bi-predictive-IBC-based candidate when the specific one of the at least one bi-predictive-IBC-based candidate is derived in a direct block vector (DBV) mode.

18. The electronic device according to claim 11, wherein:

the specific one of the at least one bi-predictive-IBC-based candidate includes a chroma intra prediction mode that is derived based on a mode reference block when the specific one of the at least one bi-predictive-IBC-based candidate is derived in a chroma direct mode (DM), and the mode reference block is indicated by the specific one of the two luma block vectors that corresponds to the specific one of the at least one bi-predictive-IBC-based candidate.

* * * * *